US010208168B2

United States Patent
Dubois

(10) Patent No.: US 10,208,168 B2
(45) Date of Patent: Feb. 19, 2019

(54) POLYOXYALKYLENEAMINE MODIFIED SULFONATED BLOCK COPOLYMERS, THEIR PREPARATION AND THEIR USE

(75) Inventor: Donn Dubois, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 1435 days.

(21) Appl. No.: 13/280,823

(22) Filed: Oct. 25, 2011

(65) Prior Publication Data
US 2013/0102213 A1    Apr. 25, 2013

(51) Int. Cl.
| | |
|---|---|
| B32B 5/02 | (2006.01) |
| C09D 153/00 | (2006.01) |
| C08F 8/36 | (2006.01) |
| C08F 299/00 | (2006.01) |
| C08G 81/02 | (2006.01) |
| C08F 297/04 | (2006.01) |
| B01D 71/80 | (2006.01) |
| B01D 71/82 | (2006.01) |
| C08F 8/32 | (2006.01) |
| C09J 187/00 | (2006.01) |

(52) U.S. Cl.
CPC .......... *C08G 81/025* (2013.01); *B01D 71/80* (2013.01); *B01D 71/82* (2013.01); *C08F 8/32* (2013.01); *C08F 297/046* (2013.01); *B01D 2325/14* (2013.01); *C09J 187/005* (2013.01); *Y10T 442/20* (2015.04); *Y10T 442/2762* (2015.04)

(58) Field of Classification Search
None
See application file for complete search history.

(56) References Cited

U.S. PATENT DOCUMENTS

| | | |
|---|---|---|
| 3,577,357 A | 5/1971 | Winkler |
| RE27,145 E | 6/1971 | Jones |
| 3,595,942 A | 7/1971 | Wald et al. |
| 3,634,549 A | 1/1972 | Shaw et al. |
| 3,654,370 A | 4/1972 | Yeakey |
| 3,666,007 A | 5/1972 | Yoshino et al. |
| 3,670,054 A | 6/1972 | De La Mare et al. |
| 3,700,633 A | 10/1972 | Wald et al. |
| 3,735,559 A | 5/1973 | Salemme |
| 3,985,830 A | 10/1976 | Fetters et al. |

(Continued)

FOREIGN PATENT DOCUMENTS

| | | |
|---|---|---|
| CA | 716645 A | 8/1965 |
| CA | 1177821 A | 11/1984 |

(Continued)

OTHER PUBLICATIONS

Huntsman (http://www.huntsman.com/portal/page/portal/performance_products/Media%20Library/global/files/jeffamine_polyetheramines.pdf, page visited on Feb. 26, 2018, but published in 2007 (Year: 2007).*

(Continued)

*Primary Examiner* — Shawn Mckinnon
(74) *Attorney, Agent, or Firm* — Jessica Zimberlin Eastman; Cantor Colburn LLP

(57) ABSTRACT

The present disclosure relates to polyoxyalkyleneamine ("POA") modified sulfonated block copolymers, their preparation and their use as emulsifiers as well as materials for flexible and pressure-adhesive membranes, films and coatings.

17 Claims, 3 Drawing Sheets

(56) References Cited

U.S. PATENT DOCUMENTS

| | | | |
|---|---|---|---|
| 4,039,593 | A | 8/1977 | Kamienski et al. |
| 4,040,804 | A | 8/1977 | Harrison |
| 4,107,236 | A | 8/1978 | Naylor et al. |
| 4,152,353 | A | 5/1979 | Habermann |
| 4,190,566 | A | 2/1980 | Noll et al. |
| 4,391,919 | A | 7/1983 | Burdett |
| 4,425,460 | A | 1/1984 | Makowski et al. |
| 4,444,953 | A | 4/1984 | St Clair |
| 4,449,992 | A | 5/1984 | Yamada et al. |
| 4,460,388 | A | 7/1984 | Fukami et al. |
| 4,461,344 | A | 7/1984 | Allen et al. |
| 4,618,717 | A | 10/1986 | Renken et al. |
| 4,766,245 | A | 8/1988 | Larkin et al. |
| 4,769,053 | A | 9/1988 | Fischer, Jr. |
| 4,875,520 | A | 10/1989 | Steele et al. |
| 4,888,446 | A * | 12/1989 | Klein .................. C07C 213/02 564/474 |
| 4,909,810 | A | 3/1990 | Nakao et al. |
| 4,911,775 | A | 3/1990 | Kuma et al. |
| 4,946,899 | A | 8/1990 | Kennedy et al. |
| 4,973,761 | A | 11/1990 | Schoenleben et al. |
| 5,003,107 | A | 3/1991 | Zimmerman et al. |
| 5,239,010 | A | 8/1993 | Balas et al. |
| 5,256,181 | A | 10/1993 | Manalastas et al. |
| 5,331,042 | A * | 7/1994 | Charmot .................. C08K 5/17 524/243 |
| 5,348,691 | A | 9/1994 | McElroy et al. |
| 5,352,835 | A | 10/1994 | Dai et al. |
| 5,516,831 | A | 5/1996 | Pottick et al. |
| 5,785,117 | A | 7/1998 | Grinbergs |
| 5,791,153 | A | 8/1998 | Belding et al. |
| 5,829,513 | A | 11/1998 | Urch |
| 6,145,588 | A | 11/2000 | Martin et al. |
| 6,178,966 | B1 | 1/2001 | Breshears |
| 6,233,824 | B1 | 5/2001 | Dobbs et al. |
| 6,391,981 | B1 | 5/2002 | Willis et al. |
| 6,413,298 | B1 | 7/2002 | Wnek et al. |
| 6,444,767 | B1 | 9/2002 | Schade et al. |
| 6,455,651 | B1 | 9/2002 | Willis et al. |
| 6,492,469 | B2 | 12/2002 | Willis et al. |
| 6,536,514 | B1 | 3/2003 | Sugiyama et al. |
| 6,515,083 | B2 | 4/2003 | Ozawa et al. |
| 6,686,423 | B1 | 2/2004 | Desbois et al. |
| 6,699,941 | B1 | 3/2004 | Handlin et al. |
| 6,841,601 | B2 | 1/2005 | Serpico et al. |
| 6,951,242 | B1 | 10/2005 | Des Champs et al. |
| 7,737,224 | B2 | 6/2010 | Willis et al. |
| 7,919,565 | B2 | 4/2011 | Willis et al. |
| 7,981,970 | B2 | 7/2011 | Willis et al. |
| 8,003,733 | B2 | 8/2011 | Willis et al. |
| 8,058,353 | B2 | 11/2011 | Willis et al. |
| 8,084,546 | B2 | 12/2011 | Willis et al. |
| 8,329,827 | B2 | 12/2012 | Willis et al. |
| 8,383,735 | B2 | 2/2013 | Willis et al. |
| 2006/0068198 | A1 * | 3/2006 | Bratys et al. .................. 428/337 |
| 2007/0021569 | A1 | 1/2007 | Willis et al. |
| 2008/0014505 | A1 | 1/2008 | Kato et al. |
| 2008/0200589 | A1 | 8/2008 | Hubschmid |
| 2009/0280255 | A1 * | 11/2009 | Handlin et al. ............... 427/358 |
| 2010/0048817 | A1 | 2/2010 | Dado et al. |
| 2011/0086982 | A1 * | 4/2011 | Willis .................. B01D 71/82 525/189 |

FOREIGN PATENT DOCUMENTS

| | | |
|---|---|---|
| CA | 1189062 A | 6/1985 |
| CA | 2214487 C | 11/2000 |
| EP | 06615502 A | 9/1994 |
| EP | 0707179 A2 | 12/1995 |
| GB | 1268264 | 3/1972 |
| JP | 59177119 A | 10/1984 |
| RU | 2404998 C2 | 11/2010 |
| TW | 201127856 A | 8/2011 |
| WO | 1981000616 A1 | 3/1981 |
| WO | 1993018360 A1 | 9/1993 |
| WO | 2008089332 A3 | 7/2008 |
| WO | 2009137678 A1 | 11/2009 |
| WO | 2011046708 A1 | 4/2011 |

OTHER PUBLICATIONS

Membrane Technology, An International Newsletter, No. 69, Elsevier Advanced Technology, Jan. 1996.

High Performance Fibers to Imidazole and Derivatives, Ullmann's Encyclopedia of Industrial Chemistry, Fifth Completely Revised Edition, vol. A13, pp. 341-342.

Zhang, L.Z., Jiang, Y, Heat and Mass Transfer in a Membrane-Based Energy Recovery Ventilator, Journal of Membrane Science, vol. 163, Issue 1, Oct. 1, 19999, 29-38.

Pocius, A.V., Adhesion & Adhesives: An Introduction, Hanser Publications, New York, NY, 1st Ed. (1997).

Coates, G.W., Hustad, P.D. and Reinartz, S., Angew. Chem. Int. Ed., 41, pp. 2236-2257 (2002).

Zhang, H. and Nomura, K., J. Am. Chem. Soc. Commun. 2005.

Hawker, C.J., Bosman, A.W. and Harth, E., Chem. Rev., 101(12), 3661-3688 (2001).

Taiwan Search Report for Appl. No. 101127353, dated Nov. 16, 2015.

* cited by examiner

POLYOXYALKYLENEAMINE MODIFIED SULFONATED BLOCK COPOLYMERS, THEIR PREPARATION AND THEIR USE

FIELD OF THE DISCLOSURE

The present disclosure relates to polyoxyalkyleneamine ("POA") modified sulfonated block copolymers, their preparation and their use. In particular, the present disclosure relates to sulfonated block copolymers having at least one interior block having at least two polymer end blocks A that contain essentially no sulfonic acid or sulfonate functionality and at least one polymer interior block B which contains from about 10 to about 100 mol-% of sulfonic acid or sulfonate functional groups, based on the number of sulfonation susceptible monomer units of the B block, which block copolymers are modified by reaction with an effective amount of at least one polyoxyalkyleneamine. The modified sulfonated block copolymers are water-vapor permeable, elastic, and pressure-adhesive, thus rendering them useful as materials for membranes in applications such as energy recovery ventilation, filtration and metal chelation, as well as laminates and coatings for breathable fabrics, footwear and workwear, medical applications such as wound dressings and protective clothing. Additionally, the POA modified sulfonated block copolymers exhibit emulsifying properties which render them useful, e.g., as viscosity modifier in the preparation of breathable coatings.

BACKGROUND OF THE DISCLOSURE

Styrenic block copolymers and their preparation are well known in the art. Generally, styrenic block copolymers ("SBC") can comprise internal polymer blocks and terminal end polymer blocks comprising chemically different monomer types thereby providing particular desirable properties. As an example, in a more common form, SBC's may have internal blocks of conjugated diene and external blocks having aromatic alkenyl arenes. The interaction of the differing properties of the polymer blocks allow for different polymer characteristics to be obtained. For example, the elastomer properties of internal conjugated diene blocks along with the "harder" aromatic alkenyl arenes external blocks together form polymers which are useful for an enormous variety of applications. Such SBC's can be prepared through sequential polymerization and/or through coupling reactions.

It is known also that SBC's can be functionalized in order to further modify their characteristics. An example of this is the addition of sulfonic acid or sulfonate functional groups to the polymer backbone. One of the first such sulfonated block copolymers is disclosed, for example, in U.S. Pat. No. 3,577,357 to Winkler. The resulting block copolymer was characterized as having the general configuration A-B-(B-A)$_{1-5}$, wherein each A is a non-elastomeric sulfonated monovinyl arene polymer block and each B is a substantially saturated elastomeric alpha-olefin polymer block, said block copolymer being sulfonated to an extent sufficient to provide at least 1% by weight of sulfur in the total polymer and up to one sulfonated constituent for each monovinyl arene unit. The sulfonated polymers could be used as such, or could be used in the form of their acid, alkali metal salt, ammonium salt or amine salt. According to Winkler, a polystyrene-hydrogenated polyisoprene-polystyrene triblock copolymer was treated with a sulfonating agent comprising sulfur trioxide/triethyl phosphate in 1,2-dichloroethane. The products are described as having water absorption characteristics that might be useful in water purification membranes and the like.

It has also been reported that sulfonated polymers may be neutralized with a variety of compounds. U.S. Pat. No. 5,239,010 to Pottick et al. and U.S. Pat. No. 5,516,831 to Balas et al., for example, indicate that styrene blocks with sulfonic acid functional groups may be neutralized by reacting the sulfonated block copolymer with an ionizable metal compound to obtain a metal salt.

More recently, U.S. Pat. No. 7,737,224 to Willis et al. disclosed the preparation of sulfonated polymer and inter alia illustrated a sulfonated block copolymer that is solid in water comprising at least two polymer end blocks and at least one saturated polymer interior block wherein each end block is a polymer block resistant to sulfonation and each interior block is a saturated polymer block susceptible to sulfonation, and wherein the interior blocks are sulfonated to the extent of 10 to 100 mol percent. The sulfonated block copolymers are described as having a high water vapor transport rate while at the same time having good dimensional stability and strength in the presence of water, and as being therefore valuable for many end use applications, especially where the combination of good wet strength, good water and proton transport characteristics, good methanol resistance, easy film or membrane formation, barrier properties, control of flexibility and elasticity, adjustable hardness, and thermal/oxidative stability are important. U.S. Pat. No. 7,737,224 to Willis et al. also mentions at least partially neutralizing the sulfonated block copolymer with a variety of base materials including, for example, ionizable metal compounds as well as various amines. It is further proposed that the sulfonated block copolymer may be modified by hydrogen bonding interaction with a base material which, while not sufficiently strong to neutralize the acid centers of the sulfonated block copolymer, is sufficiently strong to achieve a significant attraction to the block copolymer via a hydrogen bonding interaction.

Additionally, US 2010/0048817 to Dado et al. discloses a process for preparing sulfonated block copolymers illustrating, e.g., a process which involves providing a block copolymer having at least one end block A and at least one interior block B wherein each A block is a polymer block resistant to sulfonation and each B block is a polymer block susceptible to sulfonation wherein said A and B blocks are substantially free of olefinic unsaturation; and reacting the block copolymer with an acyl sulfate to form a sulfonated block copolymer in a reaction mixture further comprising at least one non-halogenated aliphatic solvent. The reaction mixture obtained in the process is described as comprising the sulfonated block copolymer in form of micelles and/or other polymer aggregates of definable size and distribution, as would be characteristic of polymer micelle structures. More recently, WO 2009/137678 to Handlin et al. disclosed an improved process for preparing sulfonated block copolymers and esters thereof, as well as membranes comprising them.

Polyoxyalkyleneamines are also well known in the art and are, e.g., employed as a hardener in curable epoxy resin compositions (US 2008/0200589). It is further known to employ polyoxyalkyleneamines to lower the glass transition temperature and minimum film-forming temperature of coatings obtained from aqueous coating dispersions based on acrylic or vinyl ester polymers (U.S. Pat. No. 5,331,042).

Sulfonated block copolymers as disclosed, for example, in U.S. Pat. No. 7,737,224 have been found to be capable of forming ionic micro domains which transport water and protons, but which reject salts. However, because of the high styrene content, the films are brittle, have low elongation to break, and they yield. The properties improve when the films are plasticized by water, but this is not always practical under conditions where bulk water will evaporate.

It has now surprisingly been found that modifying a sulfonated block copolymer with effective amounts of a polyoxyalkyleneamine yields products such as membranes, films and coatings which exhibit a significantly improved and broadened profile of properties.

SUMMARY OF THE DISCLOSURE

In a first aspect, the present disclosure generally provide's for a polyoxyalkyleneamine modified sulfonated block copolymer comprising:
a. at least one sulfonated block copolymer comprising at least two polymer end blocks A and at least one polymer interior block B, wherein
each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block; and
b. effective amounts of at least one polyoxyalkyleneamine.

In a second aspect, the present disclosure provides for the modified sulfonated block copolymer in accordance with the foregoing aspect, wherein each B block comprises segments of one or more vinyl aromatic monomers selected from polymerized (i) unsubstituted styrene monomers, (ii) ortho-substituted styrene monomers, (iii) meta-substituted styrene monomers, (iv) alpha-methylstyrene, (v) 1,1-diphenylethylene, (vi) 1,2-diphenylethylene and (vii) mixtures thereof.

In a third aspect, the present disclosure provides for the modified sulfonated block copolymer in accordance with either one of the foregoing aspects, having a general configuration A-B-A, A-B-A-B-A, $(A-B-A)_nX$, $(A-B)_nX$, A-D-B-D-A, A-B-D-B-A, $(A-D-B)_nX$, $(A-B-D)_nX$ or mixtures thereof, where n is an integer from 2 to about 30, and X is a coupling agent residue and wherein each D block is a polymer block resistant to sulfonation and the plurality of A blocks, B blocks, or D blocks are the same or different.

In a fourth aspect, the present disclosure provides for the modified sulfonated block copolymer in accordance with any one of the foregoing aspects, comprising one or more blocks D each block D being independently selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) a silicon polymer, (iv) polymerized isobutylene and (v) mixtures thereof, wherein any segments containing polymerized 1,3-butadiene or isoprene are subsequently hydrogenated.

In a fifth aspect, the present disclosure provides for the modified sulfonated block copolymer in accordance with any one of the foregoing aspects, comprising the polyoxyalkyleneamine(s) in an amount of from about 0.6 to 2 mol-equivalent of amine groups per mol sulfonic acid or sulfonate ester functional groups of the sulfonated block copolymer.

In a sixth aspect, the present disclosure provides for the modified sulfonated block copolymer in accordance with the foregoing fifth aspect, wherein the amount of polyoxyalkyleneamine(s) is from about 0.8 to 1.6 mol equivalent.

In a seventh aspect, the present disclosure provides for the modified sulfonated block copolymer in accordance with any one of the foregoing aspects, wherein the polyoxyalkyleneamine has a molecular weight of from about 140 to about 10,000.

In an eighth aspect, the present disclosure provides for the modified sulfonated block copolymer in accordance with the foregoing seventh aspect, wherein the polyoxyalkyleneamine has a molecular weight of from about 140 to about 5,000.

In a ninth aspect, the present disclosure provides for the modified sulfonated block copolymer in accordance with any one of the foregoing aspects, comprising at least one polyoxyalkylenemono-, -di-, or -triamine.

In a tenth aspect, the present disclosure provides for the modified sulfonated block copolymer in accordance with any one of the foregoing aspects, comprising at least one polyoxyalkyleneamine of formula $$R^1-(O-A)_x-NH_2$$

wherein
$R^1$ is $C_1$-$C_{18}$-alkyl, phenyl, optionally substituted with one or more identical or different groups selected from halogen, $C_1$-$C_{12}$-alkyl, $C_1$-$C_{12}$-haloalkyl, $C_1$-$C_{12}$-alkoxy or $C_1$-$C_{12}$-haloalkoxy, or amino-$C_2$-$C_4$-alkylene,
A is in each case independently $C_2$-$C_4$-alkylene, and
x is a number from about 2 to about 100.

In an eleventh aspect, the present disclosure generally provides for a process for modifying a non-modified sulfonated block copolymer (a) having at least one end block A and at least one interior block B wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block, which process comprises
providing a solution or dispersion comprising the non-modified sulfonated block copolymer (a) in an organic solvent, and
combining the solution or dispersion and an effective amount of at least one polyoxyalkyleneamine.

In a twelfth aspect, the present disclosure provides for the process in accordance with the foregoing eleventh aspect, wherein the solution or dispersion comprises the dissolved, non-modified sulfonated block copolymer in micellar form.

In a thirteenth aspect, the present disclosure provides for the process in accordance with the foregoing aspects eleven and twelve, wherein the organic solvent is a non-halogenated aliphatic solvent.

In a fourteenth aspect, the present disclosure provides for the process in accordance with the foregoing aspects eleven to thirteen, wherein the organic solvent comprises at least a first and a second aliphatic solvent, and wherein the B block is substantially soluble in the first solvent and the A block is substantially soluble in the second solvent.

In a fifteenth aspect, the present disclosure provides for the process in accordance with the foregoing aspects eleven to fourteen, wherein the polyoxyalkyleneamine(s) (b) is(are) added in an amount of from about 0.5 to 10 mol-equivalent of amine groups per mol sulfonic acid or sulfonate ester functional groups of the sulfonated block copolymer.

In a sixteenth aspect, the present disclosure provides for the process in accordance with the foregoing aspects eleven to fifteen, wherein the polyoxyalkyleneamine(s) (b) has (have) a molecular weight of from about 145 to about 10,000.

In a seventeenth aspect, the present disclosure provides for the process in accordance with the foregoing aspects eleven to sixteen, wherein the polyoxyalkyleneamine (b) is or comprises at least one polyoxyalkylenemono-, -di-, or -triamine.

In an eighteenth aspect, the present disclosure provides for the process in accordance with the foregoing aspects eleven to seventeen, wherein from about 60% to about 100% of the sulfonic acid or sulfonate ester functional groups of the sulfonated block copolymer (a) are modified by the polyoxyalkyleneamine(s) (b).

In a nineteenth aspect, the present disclosure provides for a membrane or film comprising the modified sulfonated block copolymer in accordance with any one of the foregoing aspects one to ten.

In a twentieth aspect, the present disclosure provides for an apparatus comprising a membrane which apparatus is selected from the group consisting of:
filtration devices, devices for controlling humidity, devices for forward electrodialysis, devices for reverse electrodialysis, devices for pressure retarded osmosis, devices for forward osmosis, devices for reverse osmosis, devices for selectively adding water, devices for selectively removing water, and batteries,
wherein the membrane comprises the modified sulfonated block copolymer in accordance with any one of the foregoing aspects one to ten.

In a twenty-first aspect, the present disclosure provides for a coated article comprising a substrate and a coating composition comprising at least one modified sulfonated block copolymer in accordance with any one of the foregoing aspects one to ten.

In a twenty-second aspect, the present disclosure provides for a coated article in accordance with the foregoing twenty-first aspect, wherein the substrate is a natural or synthetic, woven and non-woven material, or a mixture thereof.

In a twenty-third aspect, the present disclosure provides for a coated article in accordance with either one of the foregoing aspects twenty-one and twenty-two, wherein the substrate is flexible or elastic.

In a twenty-fourth aspect, the present disclosure provides for a coated article in accordance with any of the foregoing aspects twenty-one to twenty-three, wherein the coating is pressure-adhesive.

DETAILED DESCRIPTION OF REPRESENTATIVE EMBODIMENTS

Figure 1:
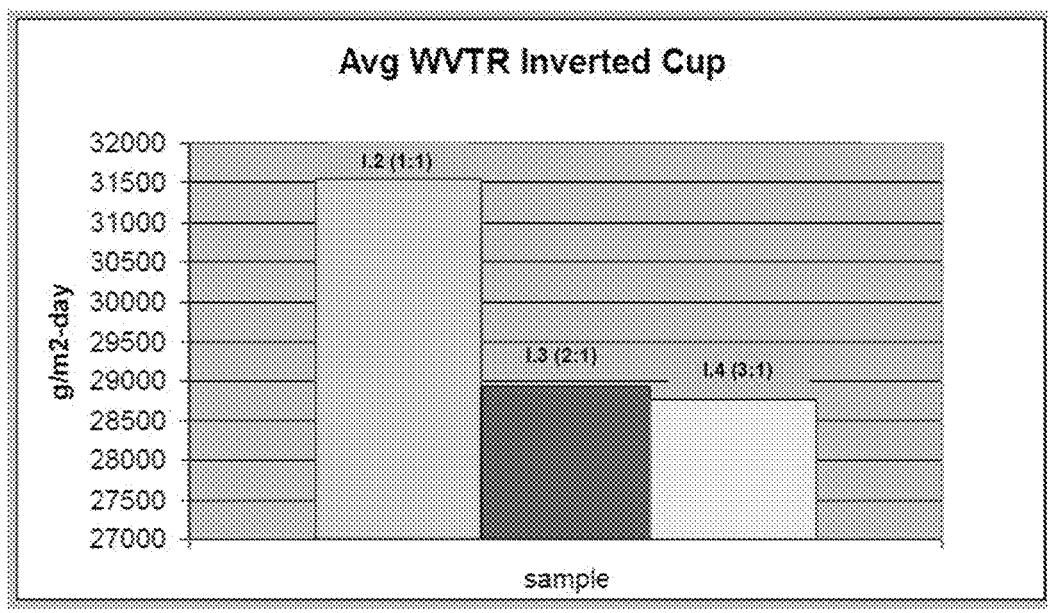
FIG. 1 illustrates the effects of modifying a sulfonated block copolymer with increasing amounts of a polyoxyalkylene monoamine on the water-vapor permeability.

A detailed description of embodiments of the present disclosure is provided herein; however, it is to be understood that the disclosed embodiments are merely exemplary, and that the disclosure may be embodied in various and alternative forms of the described embodiments. Therefore, specific structural and functional details which are addressed in the described embodiments are not to be interpreted as limiting, but merely as a basis for the claims and as a representative basis for teaching one skilled in the art to variously employ the present disclosure.

All publications, patent applications, and patents mentioned herein are incorporated by reference in their entirety. In the event of conflict, the present disclosure, including definitions, is intended to control.

Unless specifically stated otherwise, all technical terms used herein have the meaning as commonly understood by those skilled in the art.

Moreover, unless specifically stated otherwise, the following expressions as used herein are understood to have the following meanings.

The expressions "non-modified sulfonated block copolymer" and "precursor sulfonated block copolymer" as used herein refer to a sulfonated block copolymer that essentially has not been brought into contact with a polyoxyalkyleneamine.

The expressions "polyoxyalkyleneamine modified sulfonated block copolymer," "POA modified sulfonated block copolymer" and "modified sulfonated block copolymer" as used herein synonymously refer to a sulfonated block copolymer which has been contacted with effective amounts of at least one polyoxyalkyleneamine.

Unless specifically stated otherwise, the expression "%-wt." as used herein refers to the number of parts by weight of monomer per 100 parts by weight of polymer on a dry weight basis, or the number of parts by weight of ingredient per 100 parts by weight of specified composition.

Unless specifically stated otherwise, the expression "molecular weight" as used herein and relating to a polymer refers to the number average molecular weight.

Unless specifically stated otherwise, the expression "about" as used herein in connection with a numerical value is intended to indicate that the respective numerical value may vary by ±5%, or by ±2.5%, or by ±1%, or by ±0%.

The expression "hydrated" with reference to a non-modified or modified sulfonated block copolymer as used herein refers to such block copolymer which has absorbed a significant amount of water.

The expression "wet state" as used herein with reference to a non-modified or modified sulfonated block copolymer refers to the state at which such block copolymer has reached equilibrium or has been immersed in water for a period of 24 hours.

The expression "dry state" as used herein with reference to a non-modified or modified sulfonated block copolymer refers to the state of such block copolymer which has absorbed essentially no or only insignificant amounts of water. For example, a non-modified or modified sulfonated block copolymer which is merely in contact with the atmosphere will generally remain in the dry state.

Unless specifically stated otherwise, the expression "solution" as used herein refers to a liquid, uniformly dispersed mixture at the molecular or ionic level of one or more substances (the solute) in one or more liquid substances (the solvent).

Unless specifically stated otherwise, the expression "dispersion" as used herein refers to a system having a continuous, liquid phase and at least one discontinuous phase. The discontinuous phase may be made up by solid, finely divided particles and/or by liquid droplets, including colloidal particles and micelles. The expression "dispersion" as used herein in particular includes systems in which at least one discontinuous phase is in form of micelles. Also, where the discontinuous phase(s) is(are) exclusively made up by liquid droplets, the expression "dispersion" in particular encompasses "emulsion." A person of ordinary skill will readily appreciate that there are no sharp differences between dispersions, colloidal or micellar solutions and solutions on a molecular level. Thus, a dispersion of micelles may also herein be referred to as a solution of micelles.

Unless specifically stated otherwise, the expressions "elastic" and "elasticity" as used herein and relating to a membrane or film refer to its capability to recover its original shape partially or completely once a deforming force or pressure has been removed. The expressions in particular encompass "stretchable" and "stretchability," i.e., the capability of the membrane or film to recover its original dimension partially or completely once a stretching force has been removed.

As used herein, the expression "pressure-adhesive" means an adhesive that will adhere to a variety of dissimilar surfaces upon mere contact without the need of more than finger or hand pressure. Pressure-sensitive adhesives are sufficiently cohesive and elastic in riature so that, despite their tackiness, they can be handled with the fingers and repositioned on smooth surfaces with little or no residue left behind. Pressure-sensitive adhesives can be quantitatively described using the "Dahlquist criteria," which maintains that the elastic modulus of these materials is less than 106 dynes/cm2 at room temperature. See Pocius, A. V., Adhesion & Adhesives: An Introduction, Hanser Publications, New York, N.Y., 1st Ed. (1997).

The expressions "hydrophile" and "hydrophilic" as used herein are relative terms which are used to express the tendency of a molecule or portion thereof to interact with or be dissolved by water. As a rule of thumb, a molecule or a portion thereof is more hydrophilic if the molar ratio of carbon to groups which are capable of hydrogen bonding is low, and is less hydrophilic (i.e., more hydrophobic in character) if the respective ratio is high. For example, an oxybutylene moiety has a carbon to oxygen ratio of 4, an oxypropylene moiety has a carbon to oxygen ratio of 3, and an oxyethylene moiety has a carbon to oxygen ratio of 2. Thus, the oxyethylene moiety is more hydrophilic than the oxypropylene moiety which, in turn, is more hydrophilic than the oxybutylene moiety.

Further, all ranges disclosed herein are intended to include any combination of the mentioned upper and lower limits even if the particular combination and range is not specifically listed. Correspondingly, all upper and lower limit values mentioned herein are intended to illustrate any combination thereof even if the particular combination and range is not specifically mentioned.

According to several embodiments of the present disclosure it has been surprisingly found that polyoxyalkyleneamine modified sulfonated block copolymers can be obtained by directly contacting a solution of one or more sulfonated block copolymers with one or more polyoxyalkyleneamines. A broad variety of polyoxyalkyleneamines may be employed for modifying the sulfonated block copolymers and the subsequent application forms thereof. In general, the modified sulfonated block copolymers yield membranes and films which are more elastic and softer than those obtained from non-modified sulfonated block copolymers, while still maintaining high water vapor permeability. Additionally, the POA modified sulfonated block copolymers have adhesive properties, especially to polar surfaces. Therefore, in several embodiments, the modified sulfonated block copolymers yield soft adhesive membranes and films which transmit water at high rates and which exhibit a modulus below the Dahlquist criteria without the need to add oils or resins. In several embodiments, the viscosity of the membrane or film casting solution or dispersion can be adjusted by varying the type of polyoxyalkyleneamine and/or the molar ratio of sulfonate:amine groups. Also, in various embodiments the modification of the sulfonated block copolymers with POA yields spreadable, thixotropic gels which yield high quality coatings for coating applications like energy recovery ventilation films, filtration films and fabric coatings. In several embodiments, the modified sulfonated block copolymers exhibit surfactant properties which aid the preparation of stable, aqueous coating dispersions. In various embodiments, the modified sulfonated block copolymers chelate heavy metals, thus allowing their use, e.g., in membranes and films for metal filtration and metal recovery applications.

Accordingly, the modified sulfonated block copolymers described herein are broadly suited for a wide variety of end uses, and are especially useful for applications involving water vapor permeability, elasticity and adhesiveness.

A. The Sulfonated Block Copolymers

In some embodiments, the precursor sulfonated block copolymers which may be modified according to embodiments of the present disclosure include non-modified sulfonated block copolymers as described in U.S. Pat. No. 7,737,224 to Willis et al., the description of which is incorporated herein by reference in its entirety. Furthermore, the precursor sulfonated block copolymers which include non-modified sulfonated block copolymers as described in U.S. Pat. No. 7,737,224 may be prepared according to the process of US 2010/0048817 to Dado et al. or according to the process of WO 2009/137678 to Handlin et al.

The block copolymers needed to prepare the non-modified sulfonated block copolymers of the present disclosure may be made by a number of different processes, including anionic polymerization, moderated anionic polymerization, cationic polymerization, Ziegler-Natta polymerization, and living chain or stable free radical polymerization. Anionic polymerization is described below in more detail, and in the patents referenced. Moderated anionic polymerization processes for making styrenic block copolymers are described, for example, in U.S. Pat. No. 6,391,981, U.S. Pat. No. 6,455,651 and U.S. Pat. No. 6,492,469, each of which is incorporated herein by reference. Cationic polymerization processes for preparing block copolymers are disclosed, for example, in U.S. Pat. No. 6,515,083 and U.S. Pat. No. 4,946,899, each of which is incorporated herein by reference.

Living Ziegler-Natta polymerization processes that may be used to make block copolymers were recently reviewed by G. W. Coates, P. D. Hustad, and S. Reinartz in Angew. Chem. Int. Ed., 41, 2236-2257 (2002); a subsequent publication by H. Zhang and K. Nomura (J. Am. Chem. Soc. Commun., 2005) describes the use of living Ziegler-Natta techniques for making styrenic block copolymers specifically. The extensive work in the field of nitroxide mediated living radical polymerization chemistry has been reviewed; see C. J. Hawker, A. W. Bosman, and E. Barth, Chem. Rev., 101(12), 3661-3688 (2001). As outlined in this review, styrenic block copolymers were synthesized using living or stable free radical techniques. For the polymers of the present invention, nitroxide mediated polymerization methods will be the preferred living chain or stable free radical polymerization process.

1. Polymer Structure

One aspect of the modified sulfonated block copolymers described herein relates to the polymer structure of the non-modified sulfonated block copolymers. In one embodiment, the sulfonated block copolymers will have at least two polymer end or outer blocks A and at least one saturated polymer interior block B wherein each A block is a polymer block resistant to sulfonation and each B block is a polymer block susceptible to sulfonation.

Preferred structures have the general configuration A-B-A, (A-B)n(A), (A-B-A)n, (A-B-A)nX, (A-B)nX, A-B-D-B-A, A-D-B-D-A, (A-D-B)n(A), (A-B-D)n(A), (A-B-D)nX, (A-D-B)nX or mixtures thereof, where n is an integer from 2 to about 30, X is coupling agent residue and A, B and D are as defined herein below.

Most preferred structures are linear structures such as A-B-A, (A-B)2X, A-B-D-B-A, (A-B-D)2X, A-D-B-D-A, and (A-D-B)2X, and radial structures such as (A-B)nX and (A-D-B)nX where n is 3 to 6. Such block copolymers are typically made via anionic polymerization, stable free radical polymerization, cationic polymerization or Ziegler-Natta polymerization. Preferably, the block copolymers are made via anionic polymerization. It will be understood by those skilled in the art that in any polymerization, the polymer mixture will include a certain amount of A-B diblock copolymer, in addition to any linear and/or radial polymers. The respective amounts have not been found to be detrimental to the practice of the invention.

The A blocks are one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof. If the A segments are polymers of 1,3-cyclodiene or conjugated dienes, the segments will be hydrogenated subsequent to polymerization of the block copolymer and before sulfonation of the block copolymer.

The para-substituted styrene monomers are selected from para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene and mixtures of the above monomers. Preferred para-substituted styrene monomers are para-t-butylstyrene and para-methylstyrene, with para-t-butylstyrene being most preferred. Monomers may be mixtures of monomers, depending on the particular source. It is desired that the overall purity of the para-substituted styrene monomers be at least 90%-wt., preferably at least 95%-wt., and even more preferably at least 98%-wt. of the desired para-substituted styrene monomer.

When the A blocks are polymers of ethylene, it may be useful to polymerize ethylene via a Ziegler-Natta process, as taught in the references in the review article by G. W. Coates et. al, as cited above, which disclosure is herein incorporated by reference. It is preferred to make the ethylene blocks using anionic polymerization techniques as taught in U.S. Pat. No. 3,450,795, which disclosure is herein incorporated by reference. The block molecular weight for such ethylene blocks typically is between about 1,000 and about 60,000.

When the A blocks are polymers of alpha olefins of 3 to 18 carbon atoms, such polymers are prepared by via a Ziegler-Natta process, as taught in the references in the review article by G. W. Coates et. al, as cited above, which disclosure is herein incorporated by reference. Preferably, the alpha olefins are propylene, butylene, hexane or octene, with propylene being most preferred. The block molecular weight for such alpha olefin blocks typically is between about 1,000 and about 60,000.

When the A blocks are hydrogenated polymers of 1,3-cyclodiene monomers, such monomers are selected from the group consisting of 1,3-cyclohexadiene, 1,3-cycloheptadiene and 1,3-cyclooctadiene. Preferably, the cyclodiene monomer is 1,3-cyclohexadiene. Polymerization of such cyclodiene monomers is disclosed in U.S. Pat. No. 6,699,941, which disclosure is herein incorporated by reference. It will be necessary to hydrogenate the A blocks when using cyclodiene monomers since non-hydrogenated polymerized cyclodiene blocks are susceptible to sulfonation. Accordingly, after synthesis of the A block with 1,3-cyclodiene monomers, the block copolymer will be hydrogenated.

When the A blocks are hydrogenated polymers of conjugated acyclic diener having a vinyl content less than 35 mol percent prior to hydrogenation, it is preferred that the conjugated diene is 1,3-butadiene. It is necessary that the vinyl content of the polymer prior to hydrogenation be less than 35 mol percent, preferably less than 30 mol percent. In certain embodiments, the vinyl content of the polymer prior to hydrogenation will be less than 25 mol percent, even more preferably less than 20 mol percent, and even less than 15 mol percent with one of the more advantageous vinyl contents of the polymer prior to hydrogenation being less than 10 mol percent. In this way, the A blocks will have a crystalline structure, similar to that of polyethylene. Such A block structures are disclosed in U.S. Pat. No. 3,670,054 and in U.S. Pat. No. 4,107,236, each of which disclosure is herein incorporated by reference.

The A blocks may also be polymers of acrylic esters or methacrylic esters. Such polymer blocks may be made according to the methods disclosed in U.S. Pat. No. 6,767,976, which disclosure is herein incorporated by reference. Specific examples of the methacrylic ester include esters of a primary alcohol and methacrylic acid, such as methyl methacrylate, ethyl methacrylate, propyl methacrylate, n-butyl methacrylate, isobutyl methacrylate, hexyl methacrylate, 2-ethylhexyl methacrylate, dodecyl methacrylate, lauryl methacrylate, methoxyethyl methacrylate, dimethylaminoethyl methacrylate, diethylaminoethyl methacrylate, glycidyl methacrylate, trimethoxysilylpropyl methacrylate, trifluoromethyl methacrylate, trifluoroethyl methacrylate; esters of a secondary alcohol and methacrylic acid, such as isopropyl methacrylate, cyclohexyl methacrylate and isobornyl methacrylate; and esters of a tertiary alcohol and methacrylic acid, such as tert-butyl methacrylate. Specific examples of the acrylic ester include esters of a primary alcohol and acrylic acid, such as methyl acrylate, ethyl acrylate, propyl acrylate, n-butyl acrylate, isobutyl acrylate, hexyl acrylate, 2-ethylhexyl acrylate, dodecyl acrylate, lauryl acrylate, methoxyethyl acrylate, dimethylaminoethyl acrylate, diethylaminoethyl acrylate, glycidyl acrylate, trimethoxysilylpropyl acrylate, trifluoromethyl acrylate, trifluoroethyl acrylate; esters of a secondary alcohol and acrylic acid, such as isopropyl acrylate, cyclohexyl acrylate and isobornyl acrylate; and esters of a tertiary alcohol and acrylic acid, such as tert-butyl acrylate. If necessary, as raw material or raw materials, one or more of other anionic polymerizable monomers may be used together with the (meth)acrylic ester in the present invention. Examples of the anionic polymerizable monomer that can be optionally used include methacrylic or acrylic monomers such as trimethylsilyl methacrylate, N,N-dimethylmethacrylamide, N,N-diisopropylmethacrylamide, N,N-diethylmethacrylamide, N,N-methylethylmethacrylamide, N,N-di-tert-butylmethacrylamide, trimethylsilyl acrylate, N,N-dimethylacrylamide N,N-diisopropylacrylamide, N,N-methylethylacrylamide and N,N-di-tert-butylacrylamide. Moreover, there may be used a multifunctional anionic polymerizable monomer having in the molecule thereof two or more methacrylic or acrylic structures, such as methacrylic ester structures or acrylic ester structures (for example, ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate, trimethylolpropane triacrylate and trimethylolpropane trimethacrylate).

In the polymerization processes used to make the acrylic or methacrylic ester polymer blocks, only one of the monomers, for example, the (meth)acrylic ester may be used, or two or more thereof may be used in combination. When two or more of the monomers are used in combination, any copolymerization form selected from random, block, tapered block and the like copolymerization forms may be effected by selecting conditions such as a combination of the monomers and the timing of adding the monomers to the polymerization system (for example, simultaneous addition of two or more monomers, or separate additions at intervals of a given time).

The A blocks may also contain up to 15 mol percent of the vinyl aromatic monomers mentioned for the B blocks. In some embodiments, the A blocks may contain up to 10 mol percent, preferably they will contain only up to 5 mol percent, and particularly preferably only up to 2 mol percent of the vinyl aromatic monomers mentioned in the B blocks. However, in the most preferred embodiments, the A blocks will contain no vinyl monomers mentioned in the B blocks. Accordingly, the sulfonation level in the A blocks may be from 0 up to 15 mol percent of the total monomers in the A block. It will be understood by those skilled in the art that suitable ranges include any combination of the specified mol percentages even if the specific combination and range is not listed herewith.

Each B block comprises segments of one or more polymerized vinyl aromatic monomers selected from unsubstituted styrene monomer, ortho-substituted styrene monomers, meta-substituted styrene monomers, alpha-methylstyrene monomer, 1,1-diphenylethylene monomer, 1,2-diphenylethylene monomer, and mixtures thereof. In addition to the monomers and polymers noted immediately before, the B blocks may also comprise a hydrogenated copolymer of such monomer (s) with a conjugated diene selected from 1,3-butadiene, isoprene and mixtures thereof, having a vinyl content of between 20 and 80 mol percent. These copolymers with hydrogenated dienes may be random copolymers, tapered copolymers, block copolymers or controlled distribution copolymers. In one preferred embodiment, the B blocks are hydrogenated and comprise a copolymer of conjugated dienes and the vinyl aromatic monomers noted in this paragraph. In another preferred embodiment, the B blocks are unsubstituted styrene monomer blocks which are saturated by virtue of the nature of the monomer and do not require the added process step of hydrogenation. The B blocks having a controlled distribution structure are disclosed in U.S. Pat. No. 7,169,848, which disclosure is herein incorporated by reference. U.S. Pat. No. 7,169,848 also discloses the preparation of sulfonated block copolymers, albeit not the block copolymer structures claimed in the present invention. The B blocks comprising a styrene block are described herein. In one preferred embodiment, the saturated B blocks are unsubstituted styrene blocks, since the polymer will not then require a separate hydrogenation step.

In another aspect of the present invention, the block copolymer includes at least one impact modifier block D having a glass transition temperature less than 20° C. In one embodiment, the impact modifier block D comprises a hydrogenated polymer or copolymer of a conjugated diene selected from isoprene, 1,3-butadiene and mixtures thereof having a vinyl content prior to hydrogenation of between 20 and 80 mol percent and a number average molecular weight of between 1,000 and 50,000. In another embodiment, the impact modifier block D comprises an acrylate or silicone polymer having a number average molecular weight of 1,000 to 50,000. In still another embodiment, the D block is a polymer block of isobutylene having a number average molecular weight of 1,000 to 50,000.

Each A block independently has a number average molecular weight between about 1,000 and about 60,000 and each B block independently has a number average molecular weight between about 10,000 and about 300,000. Preferably each A block has a number average molecular weight of between 2,000 and 50,000, more preferably between 3,000 and 40,000 and even more preferably between 3,000 and 30,000. Preferably each B block has a number average molecular weight of between 15,000 and 250,000, more preferably between 20,000 and 200,000, and even more preferably between 30,000 and 100,000. It will be understood by those skilled in the art that suitable ranges include any combination of the specified number average molecular weights even if the specific combination and range is not listed herewith. These molecular weights are most accurately determined by light scattering measurements, and are expressed as number average molecular weight. Preferably, the sulfonated polymers have from about 8 mol percent to about 80 mol percent, preferably from about 10 to about 60 mol percent A blocks, more preferably more than 15 mol percent A blocks and even more preferably from about 20 to about 50 mol percent A blocks.

The relative amount of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in the sulfonated block copolymer is from about 5 to about 90 mol percent, preferably from about 5 to about 85 mol percent. In alternative embodiments, the amount is from about 10 to about 80 mol percent; preferably from about 10 to about 75 mol percent, more preferably from about 15 to about 75 mol percent, with the most preferred being from about 25 to about 70 mol percent. It will be understood by those skilled in the art that the ranges include any combination of the specified mol percentages even if the specific combination and range is not listed herewith.

As for the saturated B block, in one preferred embodiment the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block is from about 10 to about 100 mol percent, preferably from about 25 to about 100 mol percent, more preferably from about 50 to about 100 mol percent, even more preferably from about 75 to about 100 mol percent and most preferably 100 mol percent. It will be understood by those skilled in the art that suitable ranges include any combination of the specified mol percentages even if the specific combination and range is not listed herewith.

Typical levels of sulfonation are where each B block contains one or more sulfonic functional groups. Preferred levels of sulfonation are 10 to 100 mol percent based on the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block, more preferably about 20 to 95 mol percent and even more preferably about 30 to 90 mol percent. It will be understood by those skilled in the art that suitable ranges of sulfonation include any combination of the specified mol percentages even if the specific combination and range is not listed herewith. The level of sulfonation is determined by titration of a dry polymer sample, which has been redissolved in tetrahydrofuran with a standardized solution of NaOH in a mixed alcohol and water solvent.

2. Overall Anionic Process to Prepare Polymers

The anionic polymerization process comprises polymerizing the suitable monomers in solution With a lithium initiator. The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking ionizable hydrogen atoms make particularly suitable solvents. Frequently used are cyclic alkanes, such as cyclopentane, cyclohexane, cycloheptane, and cyclooctane, all of which are relatively non-polar. Other suitable solvents will be known to those skilled in the art and can be selected to perform effectively in a given set of process conditions, with polymerization temperature being one of the major factors taken into consideration.

Starting materials for preparing the block copolymers of the present invention include the initial monomers noted above. Other important starting materials for anionic co-polymerizations include one or more polymerization initiators. In the present invention such include, for example, alkyl lithium compounds such as s-butyllithium, n-butyllithium, t-butyllithium, amyllithium and the like and other organo lithium compounds including di-initiators such as the di-sec-butyl lithium adduct of m-diisopropenyl benzene. Other such di-initiators are disclosed in U.S. Pat. No. 6,492,469, which is incorporated herein by reference. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. No. 4,039,593 and Re. 27,145, each of which disclosures is incorporated herein by reference.

Polymerization conditions to prepare the block copolymers of the present invention are typically similar to those used for anionic polymerizations in general. In the present invention polymerization is preferably carried out at a temperature of from about −30° C. to about 150° C., more preferably about 10° C. to about 100° C., and most preferably, in view of industrial limitations, from about 30° C. to about 90° C. The polymerization is carried out in an inert atmosphere, preferably nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, and the molecular weight of the polymer that is desired. When two or more of the monomers are used in combination, any copolymerization form selected from random, block, tapered block, controlled distribution block, and the like copolymerization forms may be utilized.

It will be understood by those skilled in the art that the anionic polymerization process may be moderated by the addition of a Lewis acid, such as an aluminum alkyl, a magnesium alkyl, a zinc alkyl or combinations thereof. The effects of the added Lewis acid on the polymerization process are 1) to lower the viscosity of the living polymer solution allowing for a process that operates at higher polymer concentrations and thus uses less solvent,
2) to enhance the thermal stability of the living polymer chain end which permits polymerization at higher temperatures and again, reduces the viscosity of the polymer solution allowing for the use of less solvent, and
3) to slow the rate of reaction which permits polymerization at higher temperatures while using the same technology for removing the heat of reaction as had been used in the standard anionic polymerization process.

The processing benefits of using Lewis acids to moderate anionic polymerization techniques have been disclosed in U.S. Pat. No. 6,391,981, U.S. Pat. No. 6,455,651 and U.S. Pat. No. 6,492,469, which are herein incorporated by reference. Related information is disclosed in U.S. Pat. No. 6,444,767 and U.S. Pat. No. 6,686,423, each of which disclosures is incorporated herein by reference. The polymer made by such a moderated, anionic polymerization process can have the same structure as one prepared using the conventional anionic polymerization process and as such, this process can be useful in making the polymers of the present invention. For Lewis acid moderated, anionic polymerization processes, reaction temperatures between 100° C. and 150° C. are preferred as at these temperatures it is possible to take advantage of conducting the reaction at very high polymer concentrations. While a stoichiometric excess of the Lewis acid may be used, in most instances there is not sufficient benefit in improved processing to justify the additional cost of the excess Lewis acid. It is preferred to use from about 0.1 to about 1 mole of Lewis acid per mole of living, anionic chain ends to achieve an improvement in process performance with the moderated, anionic polymerization technique.

Preparation of radial (branched) polymers requires a post-polymerization step called "coupling". In the above radial formulas n is an integer of from 3 to about 30, preferably from about 3 to about 15, and more preferably from 3 to 6, and X is the remnant or residue of a coupling agent. A variety of coupling agents are known in the art and can be used in preparing the coupled block copolymers of the present invention. These include, for example, dihaloalkanes, silicon halides, siloxanes, multifunctional epoxides, silica compounds, esters of monohydric alcohols with carboxylic acids, (e.g. methylbenzoate and dimethyl adipate) and epoxidized oils. Star-shaped polymers are prepared with polyalkenyl coupling agents as disclosed in, for example, U.S. Pat. No. 3,985,830, U.S. Pat. No. 4,391,949 and U.S. Pat. No. 4,444,953; as well as CA 716,645, each of which disclosures is incorporated herein by reference. Suitable polyalkenyl coupling agents include divinylbenzene, and preferably m-divinylbenzene. Preferred are tetra-alkoxysilanes such as tetra-methoxysilane (TMOS) and tetra-ethoxysilane (TEOS), tri-alkoxysilanes such as methyltrimethoxysilane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

Linear polymers may also be prepared by a post-polymerization "coupling" step. However, unlike radial polymers, "n" in the above formulas is the integer 2, and is the remnant or residue of a coupling agent.

3. Process to Prepare Hydrogenated Block Copolymers

As noted, in some cases—i.e., (1) when there is a diene in the B interior blocks, (2) when the A block is a polymer of a 1,3-cyclodiene, (3) when there is an impact modifier block D and (4) when the A block is a polymer of a conjugated diene having a vinyl content of less than 35 mol percent—it is preferable to selectively hydrogenate the block copolymer to remove any ethylenic unsaturation prior to sulfonation. Hydrogenation generally improves thermal stability, ultraviolet light stability, oxidative stability, and, therefore, weatherability of the final polymer, and reduces of the risk of sulfonating the A block or the D block.

Hydrogenation can be carried out via any of the several hydrogenation or selective hydrogenation processes known in the prior art. Such hydrogenation has been accomplished using methods such as those taught in, for example, U.S. Pat. No. 3,595,942, U.S. Pat. No. 3,634,549, U.S. Pat. No. 3,670,054, U.S. Pat. No. 3,700,633, and Re. 27,145, the disclosures of which are incorporated herein by reference. These methods operate to hydrogenate polymers containing ethylenic unsaturation and are based upon operation of a suitable catalyst, or catalyst precursor, preferably comprises a Group 8 to 10 metal such as nickel or cobalt which is combined with a suitable reducing agent such as an aluminum alkyl or hydride of a metal selected from Groups 1, 2, and 13 of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Hydrogenation can be carried out under such conditions that at least about 90 percent of the conjugated diene double bonds are reduced, and between zero and 10 percent of the arene double bonds are reduced. Preferred ranges are at least about 95 percent of the conjugated diene double bonds reduced, and more preferably about 98 percent of the conjugated diene double bonds are reduced.

Once the hydrogenation is complete, it is preferable to oxidize and extract the catalyst by stirring the polymer solution with a relatively large amount of aqueous acid (preferably 1 to 30 percent by weight acid), at a volume ratio of about 0.5 parts aqueous acid to 1 part polymer solution. The nature of the acid is not critical. Suitable acids include phosphoric acid, sulfuric acid and organic acids. This stirring is continued at about 50° C. for from about 30 to about 60 minutes while sparging with a mixture of oxygen in nitrogen. Care must be exercised in this step to avoid that an explosive mixture of oxygen and hydrocarbons is formed.

4. Process to Make Sulfonated Polymers

According to the multiple embodiments disclosed herein, the above prepared block copolymers are sulfonated to obtain a sulfonated polymer product that is in solution and in micellar form.

Without being bound by any particular theory, it is the present belief that the micelle structure of the sulfonated block copolymer can be described as having a core comprising the sulfonated block or blocks having a substantial amount of spent sulfonating agent residues which is surrounded by the sulfonation resistant block or blocks swollen by an organic non-halogenated aliphatic solvent. As will be further described in more detail below, the sulfonated blocks are highly polar due to the presence of sulfonic acid and/or sulfonate ester functional groups. Accordingly, such sulfonated blocks are sequestered into a core of the molecule, while the outer sulfonation resistant polymer block forms a shell which is solvated by a non-halogenated aliphatic solvent. In addition to forming discrete micelle, there may also be formation of polymer aggregates. Without being bound by any particular theory, polymer aggregates can be described as discrete or non-discrete structures resulting from association of polymer chains in ways other than the description provided for micelles, and/or loosely aggregated groups of two or more discrete micelles. Accordingly, the solvated sulfonated block copolymer in micellar form may include discrete micelles and/or aggregates of micelles, with such solution optionally including aggregated polymer chains having structures other than the micelle structure.

As described herein, micelles can be formed as a result of the sulfonation process, or alternatively, the block copolymer may arrange in a micelle structure prior to sulfonation.

In some embodiments, for the formation of micelles, the sulfonation processes as described in US 2010/0048817 or in WO 2009/137678 may be employed. The methods are useful for preparing sulfonated styrenic block copolymers as described in U.S. Pat. No. 7,737,224.

After polymerization, the polymer can be sulfonated using a sulfonation reagent such as an acyl sulfate in at least one non-halogenated aliphatic solvent. In some embodiments, the precursor polymer can be sulfonated after being isolated, washed, and dried from the reaction mixture resulting from the production of the precursor polymer. In some other embodiments, the precursor polymer can be sulfonated without being isolated from the reaction mixture resulting from the production of the precursor polymer.

a) Solvent

The organic solvent is preferably a non-halogenated aliphatic solvent and contains a first non-halogenated aliphatic solvent which serves to solvate one or more of the sulfonation resistant blocks or non-sulfonated blocks of the copolymer. The first non-halogenated aliphatic solvent may include substituted or unsubstituted cyclic aliphatic hydrocarbons having from about 5 to 10 carbons. Non-limiting examples include cyclohexane, methylcyclohexane, cyclopentane, cycloheptane, cyclooctane and mixtures thereof. The most preferable solvents are cyclohexane, cyclopentane and methylcyclohexane. The first solvent may also be the same solvent used as the polymerization vehicle for anionic polymerization of the polymer blocks.

In some embodiments, the block copolymer may be in micellar form prior to suflonation even in the case of using only a first solvent. The addition of a second non-halogenated aliphatic solvent to a solution of the precursor polymer in the first non-halogenated aliphatic solvent can result in or assist the "pre-formation" of polymer micelles and/or other polymer aggregates. The second non-halogenated solvent, on the other hand, is preferably chosen such that it is miscible with the first solvent, but is a poor solvent for the sulfonation susceptible block of the precursor polymer in the process temperature range and also does not impede the sulfonation reaction. In other words, preferably, the sulfonation susceptible block of the precursor polymer is substantially insoluble in the second non-halogenated solvent in the process temperature range. In the case where the sulfonation susceptible block of the precursor polymer is polystyrene, suitable solvents which are poor solvents for polystyrene and can be used as the second non-halogenated solvent include linear and branched aliphatic hydrocarbons of up to about 12 carbons, for example, hexane, heptane, octane, 2-ethyl hexane, isooctane, nonane, decane, paraffinic oils, mixed paraffinic solvents, and the like. One preferred example of the second non-halogenated aliphatic solvent is n-heptane.

The pre-formed polymer micelles and/or other polymer aggregates can allow that the sulfonation of the polymer proceeds essentially without disabling gelling at considerably higher concentration than can be achieved without the addition of the second solvent. In addition, this approach can substantially improve the utility of more polar acyl sulfates, such as C3 acyl sulfate (propionyl sulfate), in terms of polymer sulfonation conversion rate and minimization of by-products. In other words, this approach may improve the utility of more polar sulfonation reagents. Such acyl sulfates are further described below.

b) Polymer Concentration

In accordance with some embodiments, high levels of styrene sulfonation can be achieved in a manner that is substantially free of polymer precipitation and free of disabling gelling in the reaction mixture, the reaction product, or both, by maintaining the precursor polymer concentration below a limiting concentration of the precursor polymer, at least during the early stages of sulfonation. It will be understood by those skilled in the art that minor amounts of polymers may deposit on surfaces as a result of localized solvent evaporation in the course of processing in a mixture that is substantially free of polymer precipitation. For example, in accordance with some embodiments, a mixture is considered to be substantially free of polymer precipitation when no more than 5% of the polymer in the mixture has precipitated.

The polymer concentration at which the sulfonation can be conducted is dependent upon the composition of the starting polymer, since the limiting concentration below which polymer gelling is non-disabling or negligible depends upon the polymer composition. As stated above, the limiting concentration may also depend on other factors such as the identity of the solvent or the solvent mixture used and the degree of sulfonation desired. Generally, the polymer concentration falls within the range of from about 1%-wt. to about −30%-wt. alternatively from about 1%-wt. to about 20%-wt., alternatively from about 1%-wt. to about 0.15%-wt., alternatively from about 1%-wt. to about 12%-wt., or alternatively from about 1%-wt. to about 10%-wt., based on the total weight of a reaction mixture that is preferably substantially free of halogenated solvents. It will be understood by those skilled in the art that suitable ranges include any combination of the specified weight percentages even if the specific combination and range is not listed herewith.

In accordance with some embodiments of the presently described technology, the initial concentration of the precursor polymer or mixture of precursor polymers should be maintained below the limiting concentration of the precursor polymer(s), alternatively in the range of from about 0.1%-wt. to a concentration that is below the limiting concentration of the precursor polymer(s), alternatively from about 0.5%-wt. to a concentration that is below the limiting concentration of the precursor polymer(s), alternatively from about 1.0%-wt. to a concentration that is about 0.1%-wt. below the limiting concentration of the precursor polymer(s), alternatively from about 2.0%-wt. to a concentration that is about 0.1%-wt. below the limiting concentration of the precursor polymer(s), alternatively from about 3.0%-wt. to a concentration that is about 0.1%-wt. below the limiting concentration of the precursor polymer(s), alternatively from about 5.0%-wt. to a concentration that is about 0.1%-wt. below the limiting concentration of the precursor polymer(s), based on the total weight of the reaction mixture. It will be understood by those skilled in the art that suitable ranges include any combination of the specified weight percentages even if the specific combination and range is not listed herewith.

At least in some embodiments, maintaining the polymer concentration below the limiting concentration can result in reaction mixtures with reduced concentrations of by-product carboxylic acid relative to the higher concentration conditions that lead to gelling.

It will be understood by those skilled in the art, however, that during the production of the sulfonated polymer in some embodiments of the present technology, especially in a semi-batch or continuous production process, the total concentration of the polymers in the reaction mixture may be above the limiting concentration of the precursor polymer.

c) Sulfonating Agent

According to multiple embodiments, acyl sulfate may be used for sulfonating the polymerized block copolymer. The acyl group preferably is derived from a C2 to C8, alternatively C3 to C8, alternatively C3 to C5, linear, branched, or cyclic carboxylic acid, anhydride, or acid chloride, or mixtures thereof. Preferably, these compounds do not contain non-aromatic carbon-carbon double bonds, hydroxyl groups, or any other functionality that is reactive with acyl sulfate or decomposes readily under sulfonation reaction conditions. For example, acyl groups that have aliphatic quaternary carbons in the alpha-position from the carbonyl functionality (e.g., acyl sulfate derived from trimethylacetic anhydride) appear to decompose readily during polymer sulfonation reaction, and preferably should be avoided in the presently described technology. Also included in the scope of useful acyl groups for the generation of acyl sulfate in the present technology are those derived from aromatic carboxylic acids, anhydrides, and acid chlorides such as benzoic and phthalic anhydride. More preferably, the acyl group is selected from the group of acetyl, propionyl, n-butyryl, and isobutyryl. Even more preferably, the acyl group is isobutyryl. It has been discovered that isobutyryl sulfate can afford high degrees of polymer sulfonation and relatively minimal by-product formation.

The formation of acyl sulfate from a carboxylic anhydride and sulfuric acid can be represented by the following reaction:

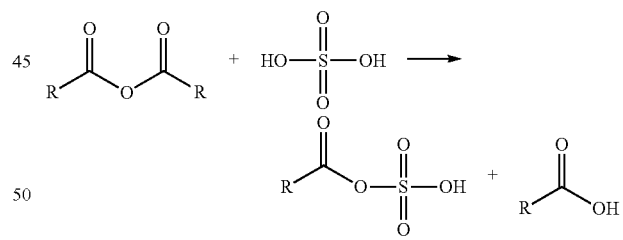

Acyl sulfates are subject to slow decomposition during the course of sulfonation reactions forming alpha-sulfonated carboxylic acids of the following formula:

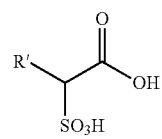

In one embodiment of the presently described technology, the acyl sulfate reagent is obtained from a carboxylic anhydride and sulfuric acid in a reaction that is conducted in a separate "pre-generation" reaction prior to addition to a solution of polymer in a non-halogenated aliphatic solvent. The pre-generation reaction can be conducted with or without a solvent. When a solvent is used to pre-generate the acyl sulfate, the solvent is preferably non-halogenated. Alternatively, the acyl sulfate reagent can be obtained in an in-situ reaction within a solution of the polymer in a non-halogenated aliphatic solvent. In accordance with this embodiment of the present technology, the molar ratio of anhydride to sulfuric acid can be from about 0.8 to about 2, and preferably from about 1.0 to about 1.4. The sulfuric acid used in this preferred method preferably has a concentration of about 93% to about 100% and more preferably has a concentration of about 95% to about 100%, by weight. Those skilled in the art will recognize that oleum may be used as an alternative to sulfuric acid in an in-situ reaction to generate acyl sulfate, provided that the oleum strength is sufficiently low so as to avoid or minimize unintended charring of the reaction mixture.

In another embodiment of the present technology, the acyl sulfate reagent can be obtained from a carboxylic anhydride and oleum in a reaction that is conducted in a separate "pre-generation" reaction prior to addition to a solution of polymer in aliphatic solvent, wherein the oleum strength is in the range of from about 1% to about 60% free sulfur trioxide, alternatively from about 1% to about 46% free sulfur trioxide, alternatively from about 10% to about 46% free sulfur trioxide, and wherein the molar ratio of anhydride to sulfuric acid present in the oleum is from about 0.9 to about 1.2.

Additionally, the acyl sulfate reagent can also be prepared from a carboxylic anhydride via reaction with any combination of sulfuric acid, oleum, or sulfur trioxide. Further, the acyl sulfate reagent can be prepared from a carboxylic acid via reaction with chlorosulfonic acid, oleum, sulfur trioxide, or any combination thereof. Moreover, the acyl sulfate reagent can also be prepared from a carboxylic acid chloride via reaction with sulfuric acid. Alternatively, the acyl sulfate may be prepared from any combination of carboxylic acid, anhydride, and/or acid chloride.

The sulfonation of polymer styrenic repeat units with the acyl sulfate can be represented by the following reaction:

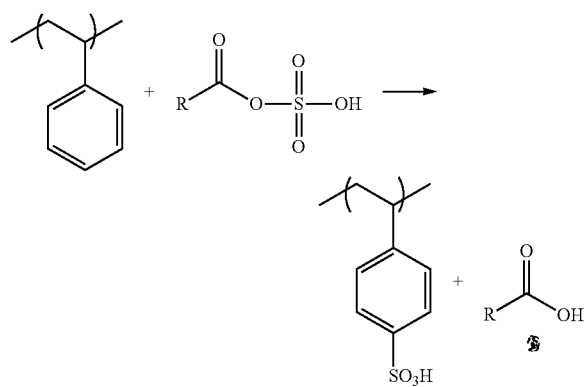

The acyl sulfate reagent may be used relative to the moles of sulfonation susceptible monomer repeat units present in the polymer solution in amounts ranging from very low levels for lightly sulfonated polymer products to high levels for heavily sulfonated polymer products. The molar amount of the acyl sulfate can be defined as the theoretical amount of the acyl sulfate that can be generated from a given method, the amount being dictated by the limiting reagent in the reaction. The molar ratio of acyl sulfate to styrene repeat units (i.e., sulfonation susceptible units) in accordance with some embodiments of the present technology may range from about 0.1 to about 2.0, alternatively from about 0.2 to about 1.3, alternatively from about 0.3 to about 1.0.

In accordance with at least some embodiments of the presently described technology, the degree of sulfonation of the vinyl aromatic monomers susceptible to sulfonation in the block copolymers is greater than about 0.4 milliequivalents (meq) sulfonic acid per gram sulfonated polymer (0.4 meq/g), alternatively greater than about 0.6 meq/g, alternatively greater than about 0.8 meq/g, alternatively greater than about 1.0 meq/g, alternatively greater than about 1.4 meq/g. For example, after the precursor polymers described above are sulfonated in accordance with the methods of the presently described technology, the typical levels of sulfonation are where each B block contains one or more sulfonic functional groups. Preferred levels of sulfonation are from about 10 to about 100 mol percent, alternatively from about 20 to 95 mol percent, alternatively from about 30 to 90 mol percent, and alternatively from about 40 to about 70 mol percent, based on the mol percent of sulfonation susceptible vinyl aromatic monomers in each B block, which can be, for example, unsubstituted styrene monomer, ortho-substituted styrene monomer, meta-substituted styrene monomer, alpha-methylstyrene monomer, 1,1-diphenyl ethylene monomer, 1,2-diphenyl ethylene monomer, a derivative thereof, or a mixture thereof. It will be understood by those skilled in the art that suitable ranges of sulfonation level include any combination of the specified mol percentages even if the specific combination and range is not listed herewith.

The level or degree of sulfonation of a sulfonated polymer can be measured by NMR and/or titration methods as known to people skilled in the art, and/or a method using two separate titrations as described in the Examples below and may be appreciated by people skilled in the art. For example, a resulting solution from the methods of the present technology can be analyzed by 1H-NMR at about 60° C. (±20° C.). The percentage styrene sulfonation can be calculated from the integration of aromatic signals in the $^1$H-NMR spectrum. For another example, the reaction product can be analyzed by two separate titrations (the "two-titration method") to determine the levels of styrenic polymer sulfonic acid, sulfuric acid, and non-polymeric by-product sulfonic acid (e.g. 2-sulfo-alkylcarboxylic acid), and then to calculate the degree of styrene sulfonation based on mass balance. Alternatively, the level of sulfonation can be determined by titration of a dry polymer sample, which has been redissolved in tetrahydrofuran with a standardized solution of NaOH in a mixture of alcohol and water. In the latter case, rigorous removal of by-product acids is preferably ensured.

Although embodiments for sulfonating polymers are described above in the context of acyl sulfate reagents, the utility of other sulfonation reagents is also contemplated. For example, the use of those sulfonation reagents obtained by complexing or reacting sulfur trioxides with phosphate esters such as triethylphosphate has been demonstrated in the present technology. The chemistry of such sulfonation reagents is known in the art to afford aromatic sulfonation with significant degrees of sulfonic acid alkyl ester incorporation. As such, the resultant sulfonated polymers likely contain both sulfonic acid and sulfonic acid alkyl ester groups. Other contemplated sulfonation reagents include, but are not limited to, those obtained by complexing or reacting sulfur trioxide with phosphorus pentoxide, polyphosphoric acid, 1,4-dioxane, triethylamine, etc.

d) Reaction Conditions

The sulfonation reaction between the acyl sulfates and sulfonation susceptible block copolymers such as aromatic-containing polymers (e.g., styrenic block copolymers) can be conducted at a reaction temperature in the range of from about 20° C. to about 150° C., alternatively from about 20° C. to about 100° C., alternatively from about 20° C. to about 80° C., alternatively from about 30° C. to about 70° C., alternatively from about 40° C. to about 60° C. (e.g., at about 50° C.). The reaction time can be in the range of from approximately less than 1 minute to approximately 24 hours or longer, dependent on the temperature of the reaction. In some preferred acyl sulfate embodiments that utilize in-situ reaction of carboxylic anhydride and sulfuric acid, the initial temperature of the reaction mixture can be about the same as the intended sulfonation reaction temperature. Alternatively, the initial temperature may be lower than the intended subsequent sulfonation reaction temperature. In a preferred embodiment, the acyl sulfate can be generated in-situ at about 20° C. to about 40° C. (e.g., at about 30° C.) for about 0.5 to about 2 hours, alternatively about 1 to about 1.5 hours, and then the reaction mixture can be heated to about 40° C. to about 60° C. to expedite the completion of the reaction.

Although not required, an optional reaction quenching step can be conducted through the addition of a quenching agent, which can be, for example, water or hydroxyl-containing compounds such as methanol, ethanol, or isopropanol. Typically in such a step, an amount of the quenching agent at least sufficient to react with residual unreacted acyl sulfate may be added.

In some embodiments of the presently described technology, the sulfonation of the aromatic-containing polymer in a non-halogenated aliphatic solvent can be carried out by contacting the aromatic-containing polymer with a sulfonation reagent in a batch reaction or a semi-batch reaction. In some other embodiments of the present technology, the sulfonation can be carried out in a continuous reaction, which can be enabled, for example, through the use of a continuous stirred tank reactor or a series of two or more continuous stirred tank reactors.

B. The Polyoxyalkyleneamines

The polyoxyalkyleneamines suitable for modifying the sulfonated block copolymers are known compounds comprising polyether chain sequences consisting of at least two oxyalkylene moieties —O-A- wherein A represents a straight chain or branched alkylene group, and further containing one or more, e.g., one, two or three, amino groups (—NH$_2$) attached to the end of the polyoxyalkylene chain and/or to an alkylene moiety A along the backbone of the polyoxyalkylene chain. In some embodiments, the polyoxyalkyleneamines have at least one amino group attached to a carbon terminus of the polyoxyalkylene chain. In some embodiments, the polyoxyalkyleneamines have at least two amino groups, each amino group being attached to a different carbon terminus of the polyoxyalkylene chain. In further embodiments, the polyoxyalkyleneamines have one, two, or three amino groups with each of the amino groups being attached to a different carbon terminus of the polyoxyalkylene chain. The expression "carbon terminus" in this context refers to a terminal alkylene moiety of the polyoxyalkylene chain. The amino group may be attached to any primary, secondary or tertiary carbon of the terminal alkylene moiety, as long as the carbon is not also bonding an oxygen member of the polyoxyalkylene chain. In particular embodiments, the amino group is attached to a primary or secondary carbon atom of a terminal alkylene moiety. The polyoxyalkyleneamines generally may have a molecular weight of from about 140 to 10,000, or from 140 to about 5000, or from about 140 to 3000.

In some embodiments, the polyoxyalkyleneamine constituent of the modified sulfonated block copolymer is or comprises at least one polyoxyalkylene mono- or diamine of formula (I)

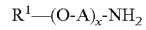

$$R^1-(O-A)_x-NH_2$$

wherein $R^1$ is $C_1$-$C_{18}$-alkyl, phenyl, optionally substituted with one or more identical or different groups selected from halogen, $C_1$-$C_{12}$-alkyl, $C_1$-$C_{12}$-haloalkyl, $C_1$-$C_{12}$-alkoxy or $C_1$-$C_{12}$-haloalkoxy, or amino-$C_2$-$C_4$-alkylene, A is in each case independently $C_2$-$C_4$-alkylene, and x is a number from about 2 to about 100.

In some embodiments, R1 in formula (I) represents a C1-C18-alkyl group which may be straight chain or branched, in particular a straight chain or branched C1-C12-, or C1-C$_8$-, or C1-C6-, or C1-C4-alkyl group, in particular a methyl or ethyl group.

In some embodiments, R1 in formula (I) represents phenyl, which is optionally substituted with one or more identical or different groups selected from halogen, C1-C12-alkyl, C1-C12-haloalkyl, C1-C12-alkoxy or C1-C12-haloalkoxy where the alkyl groups in each case may be straight chain or branched. In particular embodiments, the phenyl group is unsubstituted or is substituted with one, two or three identical or different groups selected from C1-C10-, or C1-C8-, or C1-C6-, or C1-C4-alkyl groups, in particular methyl and ethyl groups, and/or with one, two or three identical or different C1-C10-, or C1-C8-, or C1-C6-, or C1-C4-alkoxy groups, in particular methoxy and ethoxy groups.

The moieties A in formula (I) may be identical or different and represent each independently ethylene (—CH2CH2-), propylene such as 1,2-propylene (—CH2CH(CH3)-) and 1,3-propylene (—CH2CH2CH2-), or butylene such as 1,2-butylene (—CH2CH(CH2CH3)-), 1,3-butylene (—CH2CH2CH(CH3)-), 2,3-butylene (—CH(CH3)CH(CH3)-), and 1,4-butylene (—CH2CH2CH2CH2-). In some embodiments, the moieties A in formula (I) are identical or different and represent each independently ethylene or propylene such as 1,2-propylene.

The number x in formula (I) may have any value of from about 2 to about 100, or from about 2 to about 90, or from about 2 to about 70, or from about 2 to about 50. It will be understood by those having ordinary skill in the art that x is an integer for a specific molecule, and that a value of x differing from a natural number signifies that the particular formula represents a mixture of polyoxyalkyleneamines having different x values.

In some embodiments, formula (I) represents a polyoxyalkylene monoamine (I.A) wherein $R^1$ is $C_1$-$C_4$-alkyl, in particular methyl, A is in each case independently ethylene or 1,2-propylene, and x is a number from about 5 to about 50.

The molar ratio of ethylene to 1,2-propylene moieties A may vary broadly. In some embodiments, the polyoxyalkylene monoamine (I.A) comprises from 0.1 to 10 mol ethylene moieties per mol of 1,2-propylene moieties, or from 0.1 to 6 mol ethylene moieties per mol of 1,2-propylene moieties, in particular from 0.2 to 6 mol ethylene moieties per mol of 1,2-propylene moieties. In further embodiments, the molar amount of ethylene moieties is equal to or greater than the molar amount of 1,2-propylene moieties. In particular embodiments, the molar amount of ethylene moieties is at least twice the molar amount of 1,2-propylene moieties.

Suitable polyoxyalkylene monoamines (I.A) which are commercially available include, e.g.,
- JEFFAMINE® M-600 having a molecular weight of about 600 and molar ratio of ethylene to 1,2-propylene moieties of 1:9;
- JEFFAMINE® M-1000 having a molecular weight of about 1000 and molar ratio of ethylene to 1,2-propylene moieties of 19:3;
- JEFFAMINE® M-2005 having a molecular weight of about 2000 and molar ratio of ethylene to 1,2-propylene moieties of 6:29; and
- JEFFAMINE® M-2070 having a molecular weight of about 2000 and molar ratio of ethylene to 1,2-propylene moieties of 31:10.

JEFFAMINE® M-600 and JEFFAMINE® M-2005 polyoxyalkyleneamines are predominately polypropylene glycol (PPG) based, whereas JEFFAMINE® M-1000 and JEFFAMINE® M-2070 polyoxyalkyleneamines are predominately polyethylene glycol (PEG) based and are therefore more hydrophilic.

In some embodiments, formula (I) represents a polyoxyalkylene monoamine (I.B)
wherein
$R^1$ is $C_1$-$C_{18}$-alkyl, or phenyl, optionally substituted with one or more identical or different groups selected from halogen, $C_1$-$C_{12}$-alkyl, $C_1$-$C_{12}$-haloalkyl, $C_1$-$C_{12}$-alkoxy or $C_1$-$C_{12}$-haloalkoxy;
A is in each case independently ethylene or propylene, and x is a number from about 2 to about 20.

The molar ratio of ethylene to propylene moieties A may vary broadly. In some embodiments, the polyoxyalkylene diamine (I.B) comprises from 1 to 10 mol ethylene moieties per mol of propylene moieties, or from 1.5 to 7.5 mol ethylene moieties per mol of propylene moieties, in particular from 2 to 6 mol ethylene moieties per mol of propylene moieties. In some embodiments, all A moieties are ethylene moieties or all A moieties are propylene moieties. In further embodiments, the molar amount of ethylene moieties is equal to or greater than the molar amount of propylene moieties. In particular embodiments, the molar amount of ethylene moieties is at least twice the molar amount of propylene moieties.

Suitable polyoxyalkylene diamines (I.B) which are commercially available include, e.g.,
- JEFFAMINE® XTJ-435, wherein $R^1$ is a $C_{12-14}$-alkyl group, A is 1,2-propylene and x is 2; and
- JEFFAMINE® XTJ-436, wherein $R^1$ is a nonyl-substituted phenyl group, A is 1,2-propylene and x is about 13.5.

In some embodiments, formula (I) represents a polyoxyalkylene diamine (I.C) wherein
$R^1$ is amino-$C_2$-$C_4$-alkylene,
A is in each case independently ethylene or propylene, and x is a number from about 2 to about 70.

The molar ratio of ethylene to propylene moieties A may vary broadly. In some embodiments, the polyoxyalkylene diamine (I.C) comprises from 1 to 10 mol ethylene moieties per mol of propylene moieties, or from 1.5 to 7.5 mol ethylene moieties per mol of propylene moieties, in particular from 2 to 6 mol ethylene moieties per mol of propylene moieties. In some embodiments, all A moieties are ethylene moieties or all A moieties are propylene moieties. In further embodiments, the molar amount of ethylene moieties is equal to or greater than the molar amount of propylene moieties. In particular embodiments, the molar amount of ethylene moieties is at least twice the molar amount of propylene moieties.

Suitable polyoxyalkylene diamines (I.C) which are commercially available include, e.g.,
- JEFFAMINE® D-230 having a molecular weight of about 230, wherein A is 1,2-propylene and x is about 2.5;
- JEFFAMINE® D-400 having a molecular weight of about 430, wherein A is 1,2-propylene and x is about 6.1;
- JEFFAMINE® D-2000 having a molecular weight of about 2000, wherein A is 1,2-propylene and x is about 33;
- JEFFAMINE® D-4000 having a molecular weight of about 4000, wherein A is 1,2-propylene and x is about 68;
- JEFFAMINE® HK-511 having a molecular weight of about 220 and a molar ratio of ethylene to 1,2-propylene moieties of 2.0 to about 1.2;
- JEFFAMINE® ED-600 having a molecular weight of about 600 and a molar ratio of ethylene to 1,2-propylene moieties of about 9.0 to about 3.6;
- JEFFAMINE® ED-900 having a molecular weight of about 900 and a molar ratio of ethylene to 1,2-propylene moieties of about 12.5 to about 6.0;
- JEFFAMINE® ED-2003 having a molecular weight of about 2000 and a molar ratio of ethylene to 1,2-propylene moieties of about 39 to about 6.0;
- JEFFAMINE® EDR-148 having a molecular weight of about 148 and the structure $H_2N$—$(CH_2)_2$—O—$CH_2CH_2$—O—$(CH_2)_2$—$NH_2$; and
- JEFFAMINE® EDR-176 having a molecular weight of about 176 and the structure $H_2N$—$(C_{1-2})_3$—O—$CH_2CH_2$—O—$(CH_2)_3$—$NH_2$.

In further embodiments, the polyoxyalkyleneamine constituent of the modified sulfonated block copolymer is or comprises at least one polyoxyalkylene triamine of formula (II)

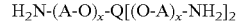

wherein
A is in each case independently a $C_2$-$C_4$-alkylene moiety as defined above, preferably ethylene or 1,2-propylene,
Q is the hydrocarbon residue of a $C_3$-$C_6$-triol such as, e.g., glycerol or trimethylolpropane and
the sum of all x is from 5 to 90.

The molar ratio of ethylene to 1,2-propylene moieties A may vary broadly. In some embodiments, the polyoxyalkylene triamine (II) comprises from 1 to 10 mol ethylene moieties per mol of propylene moieties, or from 1.5 to 7.5 mol ethylene moieties per mol of propylene moieties, in particular from 2 to 6 mol ethylene moieties per mol of propylene moieties. In some embodiments, all A moieties are ethylene moieties or all A moieties are propylene moieties. In further embodiments, the molar amount of ethylene moieties is equal to or greater than the molar amount of propylene moieties. In particular embodiments, the molar amount of ethylene moieties is at least twice the molar amount of propylene moieties.

Suitable polyoxyalkylene triamines (II) which are commercially available include, e.g.,
- JEFFAMINE® T-403 having a molecular weight of about 440, wherein A is 1,2-propylene Q is $CH_3CH_2$—C$[CH_2$—$]_3$, i.e., the hydrocarbon residue of trimethylolpropane, and the sum of all x is about 5-6;
- JEFFAMINE® T-3000 having a molecular weight of about 3000, wherein A is 1,2-propylene, Q is —CH

[CH$_2$—]$_2$, i.e., the hydrocarbon residue of glycerol, and the sum of all x is about 50; and JEFFAMINE® T-5000 having a molecular weight of about 5000, wherein A is 1,2-propylene, Q is —CH[CH$_2$—]$_2$, and the sum of all x is about 85.

The preparation of the polyoxyalkyleneamines employed in accordance with the present disclosure is well known in the art and, e.g., described in U.S. Pat. No. 3,654,370; U.S. Pat. No. 4,152,353; U.S. Pat. No. 4,618,717; U.S. Pat. No. 4,766,245; U.S. Pat. No. 4,973,761; U.S. Pat. No. 5,003,107; and U.S. Pat. No. 5,352,835. Accordingly, the polyoxyalkyleneamines generally are obtained by aminating a polyalkyleneoxide with ammonia in the presence of a catalyst such as a nickel containing catalyst such as a Ni/Cu/Cr catalyst.

C. Process to Modify the Sulfonated Block Copolymers

The modified sulfonated block copolymers of the present disclosure are obtained by a process in which a solution or dispersion of at least one non-modified sulfonated block copolymer (a) and an effective amount of at least one polyoxyalkyleneamine (b) are combined. In general, the manner of combining the components (a) and (b), and the order in which the components (a) and (b) are combined, has not been found to be critical to the formation of the modified sulfonated block copolymers. Thus, the manner and order of combining the components may be determined by considerations of process economy.

In some embodiments, the modified sulfonated block copolymers are prepared by providing a solution or dispersion of the component (a) and dispersing or dissolving appropriate amounts of the polyoxyalkyleneamine component (b) in the solution or dispersion of (a).

In other embodiments each of the components (a) and (b) is provided in a separate solution or dispersion and the separate solutions or dispersions of (a) and (b) are admixed in appropriate amounts.

In some embodiments, the solutions or dispersions of (a) and/or (b) are solutions or dispersions of the components in one or more liquids (liquid phase) suitable as solvent or dispersant. Suitable liquids are any liquids which are inert to the components (a) and (b) of the composition under the conditions for forming and using the modified sulfonated block copolymer and, thus, may be protic or aprotic and may be polar or apolar. The nature and composition of the liquid phase is generally not critical as long as the liquid phase is capable to dissolve or disperse the components (a) and (b) to a degree which is sufficient to allow for the modification reaction. Those of skill in the art will appreciate that the liquid phase may be made up of dispersants and/or solvents having similar or different polarity and/or proticity.

In some embodiments, the liquid phase comprises one or more aprotic organic solvents. Suitable aprotic organic solvents include, e.g., optionally halogenated hydrocarbons having from 4 to 12 carbon atoms. The hydrocarbons may be straight-chain, branched or mono- or polycyclic and may comprise straight-chain, branched as well as mono- or polycyclic hydrocarbon groups such as, e.g., straight-chain, branched or cyclic pentane, (mono-, di- or tri-) methylcyclopentane, (mono-, di- or tri-) ethylcyclopentane, straight-chain, branched or cyclic hexane, (mono-, di- or tri-) methylcyclohexane, (mono-, di- or tri-) ethylcyclohexane, straight-chain, branched or cyclic heptane, straight-chain, branched or (mono- or bi-) cyclic octane, 2-ethyl hexane, isooctane, nonane, decane, paraffinic oils, mixed paraffinic solvents, and the like.

In some particular embodiments, the apolar liquid phase comprises at least one solvent selected from cyclohexane, methylcyclohexane, cyclopentane, cycloheptane, cyclooctane and mixtures thereof, with cyclohexane, and/or cyclopentane, and/or methylcyclohexane being most preferred.

In other particular embodiments, the apolar liquid phase comprises at least one solvent selected from cyclohexane, methylcyclohexane, cyclopentane, cycloheptane, cyclooctane and mixtures thereof, with cyclohexane, and/or cyclopentane, and/or methylcyclohexane being most preferred.

In further particular embodiments, the apolar liquid phase is formed by at least two aprotic solvents each of which is preferably non-halogenated. In further particular embodiments, the non-polar liquid phase comprises at least one solvent selected from hexanes, heptanes and octanes and mixtures thereof, being mixed with cyclohexane and/or methylcyclohexane.

In some embodiments, the liquid phase comprises one or more protic- or aprotic-polar solvents which are preferably non-halogenated. Suitable protic- or aprotic-polar solvents which are preferably non-halogenated include, e.g., water and protic- or aprotic-polar organic solvents such as alcohol, e.g., methanol, ethanol, and the like; carboxylic acid, e.g., formic acid, acetic acid, propionic acid, and the like, ether, e.g., methyl-tert-butyl ether, tetrahydrofuran (THF), dioxane and the like, ester, e.g., ethyl acetate and the like, ketone, e.g., methyl-iso-butylketone (MIBK) and the like, formamide, e.g., dimethylformamide (DMF) and the like, sulfoxide, e.g., dimethylsulfoxide (DMSO) and the like. It will be understood by those skilled in the art that the solvent employed for mixing, dispersing or dissolving the components (a) and (b) may be a single solvent, i.e., water or one of the aforementioned organic protic- or aprotic-polar solvents or may be a combination of water and one or more organic solvents, or may be a combination of one or more organic solvents.

In some particular embodiments, the polar liquid phase is or comprises at least one protic polar solvent. In other particular embodiments, the polar liquid phase is or comprises water.

In some embodiments, the dispersion or solution of the non-modified sulfonated block copolymer(s) (a) is a micellar solution in a non-polar, liquid phase and is obtained by dissolving or dispersing at least one sulfonated block copolymer having at least one end block A and at least one interior block B wherein each block A contains essentially no sulfonic acid or sulfonate ester functional groups and each block B is a polymer block containing from about 10 to about 100 mol % sulfonic acid or sulfonate ester functional groups based on the number of monomer units present in the block B in a non-polar liquid phase.

In some embodiments, the non-polar, liquid phase is formed by one or more aprotic apolar solvents which are preferably non-halogenated. Illustrative examples include hydrocarbons having from 4 to 12 carbon atoms. The hydrocarbons may be straight-chain, branched or mono- or polycyclic and may comprise straight-chain, branched as well as mono- or polycyclic hydrocarbon groups such as, e.g., straight-chain, branched or cyclic pentane, (mono-, di- or tri-) methylcyclopentane, (mono-, di- or tri-) ethylcyclopentane, straight-chain, branched or cyclic hexane, (mono-, di- or tri-) methylcyclohexane, (mono-, di- or tri-) ethylcyclohexane, straight-chain, branched or cyclic heptane, straight-chain, branched or (mono- or bi-) cyclic octane, 2-ethyl hexane, isooctane, nonane, decane, paraffinic oils, mixed paraffinic solvents, and the like.

In particular embodiments, the non-polar liquid phase comprises at least one solvent selected from cyclohexane, methylcyclohexane, cyclopentane, cycloheptane, cyclooctane and mixtures thereof, with cyclohexane, and/or cyclopentane, and/or methylcyclohexane being most preferred.

In further embodiments, the non-polar liquid phase is formed by at least two aprotic solvents each of which is preferably non-halogenated. In further particular embodiments, the non-polar liquid phase comprises at least one solvent selected from hexanes, heptanes and octanes and mixtures thereof, being mixed with cyclohexane and/or methylcyclohexane.

The concentration of the sulfonated block copolymer(s) (a) in the non-polar liquid phase depends upon the composition of the non-modified sulfonated block copolymer, since the limiting concentration below which polymer gelling is non-disabling or negligible depends upon the polymer composition. The limiting concentration may also be dependent on other factors such as the identity of the solvent or the solvent mixture. Generally, the polymer concentration falls within the range of from about 0.1%-wt. to about 30%-wt., alternatively from about 0.5%-wt. to about 20%-wt., alternatively from about 1%-wt. to about 15%-wt., alternatively from about 1%-wt. to about 12%-wt., or alternatively from about 1%-wt. to about 10%-wt., based on the total weight of a reaction mixture that is preferably substantially free of halogenated solvents. It will be understood by those skilled in the art that suitable ranges include any combination of the specified weight percentages even if the specific combination and range is not listed herewith.

Alternatively, the micellar solution/dispersion of the non-modified sulfonated block copolymer may be prepared by sulfonating a corresponding block copolymer precursor in the manner described in the foregoing.

In various embodiments, the polyoxyalkyleneamine component (b) is dispersed or dissolved in the solution or dispersion of the non-modified sulfonated block copolymer. Where the polyoxyalkyleneamine component (b) is solid it may be advantageous to employ the polyoxyalkyleneamine in form of a separate solution or dispersion to aid even distribution and mixing of the components.

Where the polyoxyalkyleneamine component (b) is employed in form of a solution or dispersion, the nature of the solvent or dispersant phase is generally not critical. The choice of the solvent or dispersant, or mixture of solvents and dispersants, is generally governed by considerations of miscibility with the liquid phase of the solution or dispersion of the non-modified sulfonated block copolymer (a), the capability to dissolve or disperse both components to a degree which is sufficient to allow for the modification reaction to take place, and inertness to the components (a) and (b) under the conditions of the modification reaction. Accordingly, the aforementioned protic or aprotic, polar or apolar solvents and dispersants may be used for forming a solution or dispersion of the polyoxyalkyleneamine component (b).

In some embodiments, the liquid phase comprises one or more aprotic organic solvents. Suitable aprotic organic solvents include, e.g., optionally halogenated hydrocarbons having from 4 to 12 carbon atoms. The hydrocarbons may be straight-chain, branched or mono- or polycyclic and may comprise straight-chain, branched as well as mono- or polycyclic hydrocarbon groups such as, e.g., straight-chain, branched or cyclic pentane, (mono-, di- or tri-) methylcyclopentane, (mono-, di- or tri-) ethylcyclopentane, straight-chain, branched or cyclic hexane, (mono-, di- or tri-) methylcyclohexane, (mono-, di- or tri-) ethylcyclohexane, straight-chain, branched or cyclic heptane, straight-chain, branched or (mono- or bi-) cyclic octane, 2-ethyl hexane, isooctane, nonane, decane, paraffinic oils, mixed paraffinic solvents, and the like.

In some particular embodiments, the apolar liquid phase comprises at least one solvent selected from cyclohexane, methylcyclohexane, cyclopentane, cycloheptane, cyclooctane and mixtures thereof, with cyclohexane, and/or cyclopentane, and/or methylcyclohexane being most preferred.

In other particular embodiments, the apolar liquid phase comprises at least one solvent selected from cyclohexane, methylcyclohexane, cyclopentane, cycloheptane, cyclooctane and mixtures thereof, with cyclohexane, and/or cyclopentane, and/or methylcyclohexane being most preferred.

In further particular embodiments, the apolar liquid phase is formed by at least two aprotic solvents each of which is preferably non-halogenated. In further particular embodiments, the non-polar liquid phase comprises at least one solvent selected from hexanes, heptanes and octanes and mixtures thereof, being mixed with cyclohexane and/or methylcyclohexane.

In some embodiments, the liquid phase comprises one or more protic- or aprotic-polar solvents which are preferably non-halogenated. Suitable protic- or aprotic-polar solvents which are preferably non-halogenated include, e.g., water and protic- or aprotic-polar organic solvents such as alcohol, e.g., methanol, ethanol, and the like; carboxylic acid, e.g., formic acid, acetic acid, propionic acid, and the like, ether, e.g., methyl-tert-butyl ether, tetrahydrofuran (THF), dioxan and the like, ester, e.g., ethyl acetate and the like, ketone, e.g., methyl-iso-butylketone (MIBK) and the like, formamide, e.g., dimethylformamide (DMF) and the like, sulfoxide, e.g., dimethylsulfoxide (DMSO) and the like. It will be understood by those skilled in the art that the solvent employed for mixing, dispersing or dissolving the components (a) and (b) may be a single solvent, i.e., water or one of the aforementioned organic protic- or aprotic-polar solvents or may be a combination of water and one or more organic solvents, or may be a combination of one or more organic solvents.

In some particular embodiments, the polar liquid phase is or comprises at least one protic polar solvent. In other particular embodiments, the polar liquid phase is or comprises water.

The concentration of the polyoxyalkyleneamine component (b) in the liquid phase is generally not critical and can be varied broadly, depending on the nature of the polyoxymethylene component and the nature of the liquid phase. In some embodiments, the concentration will be within a range of from about 5%-wt. to about 98%-wt., alternatively from about 10%-wt. to about 95%-wt., alternatively from about 25%-wt. to about 90%-wt., or from about 40%-wt. to about 80%-wt., based on the total weight of the solution or dispersion of the polyoxyalkyleneamine component (b). It will be understood by those skilled in the art that suitable ranges include any combination of the specified weight percentages even if the specific combination of limit values and the specific range is not listed herewith.

The modification reaction may normally be conducted at a temperature in the range of from (−40)° C. to the boiling point of the solvent or solvent mixture. The reaction may be exothermic, i.e., may increase the temperature of the reaction medium by about 10 to 20° C., depending on the nature of the polyoxyalkyleneamine, the amount per time in which the polyoxyalkyleneamine is added, and on the degree to which the block copolymer is sulfonated. It will be understood by those skilled in the art that an increase in temperature may be controlled by the rate at which the components are combined, and an undesirable increase in temperature may be countered by cooling. In some of the embodiments, the temperature may be in the range of from about (−20)° C. to about 60° C., or from about 15° C. to about 40° C. In some embodiments, the non-modified sulfonated block copolymer component (a) and the polyoxyalkyleneamine component (b) are combined at room temperature (about 20 to 25° C.).

Upon combining the components (a) and (b) the viscosity may increase. In some cases, the increase in viscosity is temporary. It will be understood by those skilled in the art that an undesirable increase in viscosity can be alleviated by introducing additional amounts of the liquid phase.

The non-modified sulfonated block copolymer component (a) and the polyoxyalkyleneamine component (b) are generally combined in amounts of from 0.5 to 10 mol-equivalent of amine groups per mol sulfonic acid or sulfonate ester functional groups of the non-modified sulfonated block copolymer. In some embodiments, the polyoxyalkyleneamine component (b) is employed in amounts of from 0.65 to 7.5, alternatively 0.8 to 5, mol-equivalent of amine groups per mol sulfonic acid or sulfonate ester functional groups of the non-modified sulfonated block copolymer. In other embodiments, the polyoxyalkyleneamine component (b) is employed in amounts of from 0.9 to 7.5, alternatively from 0.9 to 5, alternatively from 0.9 to 4, mol-equivalent of amine groups per mol sulfonic acid or sulfonate ester functional groups of the non-modified sulfonated block copolymer. It will be understood by those skilled in the art that suitable ranges include any combination of the specified mol-equivalents even if the specific combination of limit values and the specific range is not listed herewith.

In the modified sulfonated block copolymer in accordance with the present disclosure, from about 60% to about 100% of the sulfonic acid or sulfonate ester functional groups of the sulfonic acid or sulfonate ester groups which are present are modified by the polyoxyalkyleneamine(s) (b). In some embodiments, from about 70 to about 100%, alternatively from about 80 to about 100%, alternatively from about 90 to about 100%, of the sulfonic acid or sulfonate ester groups are modified. In further embodiments, from about 65 to about 98%, alternatively from about 65 to about 95%, alternatively from about 75 to about 95%, of the sulfonic acid or sulfonate ester groups are modified. It will be understood by those skilled in the art that suitable ranges include any combination of the specified percentages even if the specific combination of limit values and the specific range is not listed herewith.

The quality of the modified sulfonated block copolymer which is obtained in accordance with the foregoing procedure, as well as the completeness of the modification reaction, may be influenced by the homogeneity of the reaction mixture comprising the components (a) and (b). Thus, admixture of the components (a) and (b) is advantageously aided by means of suitable mixing equipment or homogenizers known in the art. In most embodiments, conventional tank or pipe mixing procedures will be suited to obtain a composition of adequate homogeneity. In some embodiments it may be advantageous to mix the components (a) and (b) in a conventional homogenizer. Those having skill in the art will appreciate that the thoroughness of mixing may also be facilitated by decreasing the amount of the component (a) and/or (b) in their respective solution or dispersion, and/or in the composition comprising (a) and (b). The choice of suitable equipment and concentrations will generally depend on ecologic and economic factors.

Generally, the reaction time may range from approximately less than 1 minute to approximately 24 hours or longer. Preferably, completion is reached within about 1 hour, or within 30 minutes. In some embodiments, the reaction is instantaneous, i.e., the modification reaction is completed within less than 20 minutes. The expression "reaction time" in this context is understood to be the interval of time starting when all of the reactants have been combined and ending when the modification reaction has reached completion.

The modified sulfonated block copolymer may be separated from the reaction mixture by evaporating the reaction solvent(s) optionally at a reduced pressure and optionally at an elevated temperature. In some embodiments, the reaction mixture comprising the modified sulfonated block copolymers may be used without further processing.

D. Emulsifiers and Viscosity Modifiers

The reaction mixture which is obtained in accordance with the foregoing process and which is a solution or dispersion comprising the modified sulfonated block copolymer of the present disclosure can be used as such as an emulsifier and viscosity modifier for textile coatings.

In some embodiments, the reaction mixture may be concentrated prior to use. The reaction mixture may be concentrated by conventional methods suited to partially remove the reaction solvent(s), i.e., by evaporation optionally at a reduced pressure and/or at an elevated temperature. The degree to which the reaction mixture is concentrated will depend on the intended application and can be determined by those skilled in the art by routine experiments.

E. Casting and Coating Compositions

Additionally, the reaction mixture which is obtained in accordance with the foregoing process and which is a solution or dispersion comprising the modified sulfonated block copolymer of the present disclosure can be used as a film casting or coating composition to prepare the membranes and films of the present disclosure.

In some embodiments the casting or coating composition may include further additives known in the art to facilitate the preparation and/or use of the composition, or to modify the properties of the resulting membrane, film or coating, e.g., surfactants, viscosity modifiers, plasticizing agents, stabilizers to help protect the polymer chains from degradation for example caused by UV light or oxidation, fillers, dyes, and matting agents or delustrants.

Suitable plasticizers include ester derivatives of such acids and anhydrides as adipic acid, azelaic acid, benzoic acid, citric acid, dimer acids, fumaric acid, isobutyric acid, isophthalic acid, lauric acid, linoleic acid, maleic acid, maleic anyhydride, melissic acid, myristic acid, oleic acid, palmitic acid, phosphoric acid, phthalic acid, ricinoleic acid, sebacic acid, stearic acid, succinic acid, 1,2-benzenedicarboxylic acid, and the like, and mixtures thereof. Also suitable are epoxidized oils, glycerol derivatives, paraffin derivatives, sulfonic acid derivatives, and the like, and mixtures thereof and with the aforesaid derivatives. Specific examples of such plasticizers include diethylhexyl adipate, heptyl nonyl adipate, diisodecyl adipate, the adipic acid polyesters sold by Solutia as the Santicizer series, dicapryl adipate, dimethyl azelate, diethylene glycol dibenzoate and dipropylene glycol dibenzoate (such as the K-Flex™ esters from Noveon, Inc.), polyethylene glycol dibenzoate, 2,2,4-trimethyl-1,3-pentanediol monoisobutyrate benzoate, 2,2,4- trimethyl-1,3-pentanediol diisobutyrate, methyl (or ethyl, or butyl) phthalyl ethyl glycolate, triethyl citrate, dibutyl fumarate, 2,2,4-trimethyl-1,3-pentanediol diisobutyrate, methyl laurate, methyl linoleate, di-n-butyl maleate, tricapryl trimellitate, heptyl nonyl trimellitate, triisodecyl trimellitate, triisononyl trimellitate, isopropyl myristate, butyl oleate, methyl palmitate, tricresyl phosphate, dimethyl phthalate, diethyl phthalate, dibutyl phthalate, diisobutyl phthalate, di-2-ethylhexyl phthalate, octyl decyl phthalate, diisodecyl phthalate, heptyl nonyl phthalate, diundecyl phthalate, ditridecyl phthalate, dicyclohexyl phthalate, diphenyl phthalate, butyl benzyl phthalates such as the n-butylbenzyl ester of o-phthalic acid, isodecyl benzyl phthalate, alkyl (C7/C9) benzyl phthalate, dimethoxyethyl phthalate, 7-(2,6,6,8-tetramethyl-4-oxa-3-oxo-nonyl)benzyl phthalate, di-2-ethylhexyl sebacate, butyl ricinoleate, dimethyl sebacate, methyl stearate, diethyl succinate, the butyl phenylmethyl ester of 1,2-benzenedicarboxylic acid, epoxidized linseed oil, glycerol triacetate, chloroparaffins having about 40% to about 70% chlorine, o,p-toluenesulfonamide, N-ethyl p-toluene sulfonamide, N-cyclohexyl p-toluene sulfonamide, sulfonamide-formaldehyde resin, and the like, and mixtures thereof. Other suitable plasticizers known to those skilled in the art include castor oil, sunflower seed oil, soybean oil, aromatic petroleum condensate, partially hydrogenated terphenyls, silicone plasticizers such as dimethicone copolyol esters, dimethiconol esters, silicone carboxylates, guerbet esters, and the like, alone or as mixtures with other plasticizers.

Dibenzoate esters are of particular interest in personal care applications as replacements for more hazardous components. Dibenzoate esters increase film flexibility and improve the dried film's resistance to moisture. Suitable dibenzoate esters include those set forth heretofore as well as the preferred p-aminobenzoic acid (PABA) esters, which are known to absorb UV (ultraviolet) radiation in the UVC band or region of the spectrum.

Examples of suitable reactive plasticizers include compositions and mixtures having ethylenic unsaturation, such as triallyl trimellitate (TATM), Stepanol PD-200LV (a mixture of (1) unsaturated oil and (2) polyester diol reaction product of o-phthalic acid and diethylene glycol from Stepan Company), and the like, and mixtures thereof. Other suitable reactive plasticizers include epoxidized plasticizers, including certain monofunctional and polyfunctional glycidyl ethers such as Heloxy™ Modifier 505 (polyglycidyl ether of castor oil) and Heloxy™ Modifier 71 (dimer acid diglycidyl ether) from Shell Chemical Company, and the like, and mixtures thereof.

Examples of suitable flame retardant plasticizers include phosphorus-based plasticizers such as cyclic phosphates, phosphites, and phosphate esters, exemplified by Pliabrac™ TCP (tricresyl phosphate), Pliabrac™ TXP (trixylenyl phosphate), Antiblaze™ N (cyclic phosphate esters), Antiblaze™ TXP (tar acid, cresol, xylyl, phenol phosphates), and Antiblaze™ 524 (trixylyl phosphate) from Albright & Wilson Americas; Firemaster™ BZ 54 (halogenated aryl esters) from Great Lakes Chemicals; chlorinated biphenyl, 2-ethylhexyl diphenyl phosphate, isodecyl diphenyl phosphate, triphenyl phosphate, cresyl diphenyl phosphate, p-t-butylphenyl diphenyl phosphate, triphenyl phosphite, and the like. Other examples of phosphorus-based plasticizers include chlorinated alkyl phosphate esters such as Antiblaze™ 100 (chloro alkyl diphosphate ester) from Albright & Wilson Americas; alkyl phosphates and phosphites such as tributyl phosphate, tri-2-ethylhexyl phosphate, and triisoctyl phosphite; other organophosphates and organophosphites such as tributoxy ethylphosphate; other phosphates and phosphonates such as chlorinated diphosphate and chlorinated polyphosphonate; and the like. Mixtures can also be used.

Examples of suitable wetting, emulsifying, and conditioning plasticizers include alkyloxylated fatty alcohol phosphate esters such as oleth-2 phosphate, oleth-3 phosphate, oleth-4 phosphate, oleth-10 phosphate, oleth-20 phosphate, ceteth-8 phosphate, ceteareth-5 phosphate, ceteareth-10 phosphate, PPG ceteth-10 phosphate, and the like, and mixtures thereof.

In some embodiments, one or more antioxidants selected from anti-oxidants based on t-butylated phenols, UV absorbers based on benzotriazoles and hindered amine light stabilisers (HALS) are employed at a level of from about 0.1 to about 0.4%-wt. per antioxidant.

Matting agents or delustrants are commonly added to the compositions where they are intended as coating formulations for textiles, usually to decrease surface gloss and improve opacity, but they can also reduce the tendency of the coated surface to stick or "block" to another surface, or to itself. Blocking can occur, for example, when soft or unduly tacky coatings come into contact with other surfaces under pressure or at elevated temperatures. Such conditions might arise for example when tightly wound rolls of fabric or film or stacked garments are stored or transported in excessive heat or humidity, or if normally suitable coatings are severely degraded e.g. by hydrolysis. The selection of matting agent may be important because it may have a deleterious effect on the water-vapor permeability and water permeability of the solid membranes, especially at high loadings. If matting particles are too large or coarse or poorly wettable, they may cause gross defects such as pinholes or cracks in the membranes and films. Conversely, if the particles are too fine and packed close together or form overlapping platelets, they can impede the flow of water-vapor. In some embodiments, matting agents based on organically-coated, precipitated silica with particle size of from 2 to 5, e.g. 2 to 4 µm, are employed, e.g., in amounts of from about 10 to about 20%-wt. based on the total dry weight of the modified sulfonated block copolymer.

Further additives, e.g., colorants, pigments or flame retardants may be incorporated in the casting or coating compositions of the present disclosure before they are cast as coatings. Cheapening fillers may also be included.

Moreover, the casting or coating compositions can comprise additives such as stabilizers such as Stabaxol™ P200, thickeners, coalescing agents such as di(propylene glycol) methyl ether (DPM). Slip and release agents, antimicrobial agents, surfactants such as Pluronic™ F68-LF and IGEPAL™ CO630 and silicone surfactants, metals, antioxidants, UV stabilizers, antiozonants, and the like, can optionally be added as appropriate before and/or during the processing of the casting or coating compositions of this disclosure into finished products as is well known to those skilled in the art.

The casting or coating compositions of the present disclosure generally may have a solids content up to about 70%-wt. although the membranes, films or coatings may not necessarily be prepared from a casting or coating composition having the highest levels of solids. However, casting or coating composition of the present disclosure in which the solids levels and the concentrations are as high as possible are advantageous for storage or transport of the dispersions and solutions to minimize storage volume and shipping costs. Also, storage- and/or transport-grade dispersions and solutions can desirably be diluted prior to final use to a solids content or viscosity level which is suited for the purposes of a particular application. The thickness of the membranes, films or coatings to be prepared and the method of applying the composition to a substrate will usually dictate the solids level of the dispersion and the viscosity of the solution. When preparing membranes, films or coatings from the dispersion according to the disclosure, the solids content of the dispersion generally will be from 5 to about 60%-wt., preferably from about 10 to about 50%-wt., or from about 15 to about 45%-wt.

F. Membranes and Films

The casting dispersions and solutions of the present disclosure are suitable to produce elastic membranes and films comprising:
a. at least one sulfonated block copolymer comprising at least two polymer end blocks A and at least one polymer interior block B, wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block; and
b. effective amounts of at least one polyoxyalkyleneamine.

The casting solutions or dispersions of the present disclosure can be used to prepare either flat or hollow fiber membranes according to conventional casting techniques. Specifically, membranes are suitably prepared by a process comprising:
i) casting a layer of the casting solutions or dispersions on a support; and
ii) removing the solvent or diluent portion of the casting solutions or dispersions by vaporization.

The vaporization of solvent in step (ii) can be carried out suitably at an elevated temperature and for a period of time. In general, the temperature may range from 50° C. to 180° C. for a period of at least 30 sec.

The membranes and films obtained in this manner are suitable as filtration membranes, e.g., metal filtration membranes, in filtration devices, water-vapor permeable membranes in devices for controlling humidity, devices for selectively adding water, devices for selectively removing water, and as semipermeable membranes in devices for forward electrodialysis, devices for reverse electrodialysis, devices for pressure retarded osmosis, devices for forward osmosis, devices for reverse osmosis, and in batteries.

G. Coatings and Coated Articles

The coating dispersions and solutions of the present disclosure are generally employed to provide coated articles having a coating comprising:
a. at least one sulfonated block copolymer comprising at least two polymer end blocks A and at least one polymer interior block B, wherein each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block; and
b. effective amounts of at least one polyoxyalkyleneamine.

Substrates which may be coated with the coating dispersions and solutions according to the present disclosure include natural and synthetic, woven and non-woven materials as well as substrates made of one or more of such materials. The shape and form of the substrate may vary broadly, and includes fibers, films, textiles, leather and wood parts and constructs.

Any fibrous material can be coated, impregnated or otherwise treated with the compositions of this disclosure by methods well known to those skilled in the art, including carpets as well as textiles used in clothing, upholstery, tents, awnings, and the like. Suitable textiles include fabrics, yarns, and blends, whether woven, non-woven, or knitted, and whether natural, synthetic, or regenerated. Examples of suitable textiles include cellulose acetate, acrylics, wool, cotton, jute, linen, polyesters, polyamides, regenerated cellulose (Rayon), and the like.

The methods available for manufacturing such coated articles are in principle known in the art and include, for example, direct coating, transfer coating, and a number of different film lamination processes. In a direct coating method, a coating composition of the present disclosure is cast onto the appropriate substrate, usually a textile, and subsequently dried, and optionally cured or crosslinked, e.g. under controlled conditions of temperature and dwell time or throughput. This provides a coated layer comprising the components (a) and (b) on the substrate. The coated layer is typically non-microporous.

In this method, the coated layer may be provided either directly on the substrate, or the substrate may comprise one or more additional layers, e.g. polymer layers, on its surface. Water-vapor permeable tie or base coats and intermediate layers may, for example, be present on the substrate surface. For instance, the substrate may be a textile having a layer of foamed, microporous or hydrophilic polymer. Thus, multi-layer coatings having several coated layers (and/or film layers) are provided. Typically, the coated layer of the disclosure is provided as the outermost layer.

In a transfer coating method, the composition of the disclosure is cast onto a removable release substrate, e.g. release paper and then dried and optionally cured to provide a film on the release substrate. The film is typically non-microporous. The release substrate is, for example, a siliconised paper or blanket. The film may be stored and/or transported in this format prior to further use, or the release substrate may be removed prior to storage or use.

The film is typically then bonded to a material, optionally using a layer of adhesive. The layer of adhesive may be applied to either the film or the material or both the film and the material. The adhesive layer may be either continuous or discontinuous and typically comprises a foamed, microporous or hydrophilic polymer formulation. The release substrate is removed either before or after application of the film to the material.

Directly coated layers as well as multi-layer coatings may be produced in this way. For example, the film which is applied to the material may be a pre-formed multi-layer film, and/or additional layers may be present on the material prior to application of the film of the disclosure. These additional layers may be water-vapor permeable tie or base coats and intermediate layers. Thus, multi-layer films, and materials coated with multiple film layers (and/or coated layers), are provided. Typically, the film layer comprising the modified sulfonated block copolymer of the disclosure is provided as the outermost layer.

It will be understood by those skilled in the art that the coated articles in accordance with the present disclosure may comprise a coated layer or film layer obtained from the disclosed coating composition in combination with a hydrophilic layer. Suitable hydrophilic layers are, for example, layers containing from 30 to 60% by weight of poly(ethylene oxide) soft segments as, e.g., described in U.S. Pat. No. 4,190,566. The coated layer or film layer in accordance with the present disclosure is typically the outermost layer.

Combinations of low swell outer layers comprising a coating according to the present disclosure with conventional hydrophilic layers may be anisotropic and show a strong directional effect of water-vapor flow on the water resistance value. This effect is most obvious in bilayer and multilayer films comprising low swell and hydrophilic polymers, and the magnitude of the effect is significant in the context of overall breathability of materials such as waterproof breathable fabrics (WBF). Synergy may be observed when the vapor flow occurs first through a hydrophilic surface, which results in lower than expected water resistance values for the composite. Conversely, vapor flow that occurs first through the low swell surface has an undermining effect on the hydrophilic layer, which results in higher than expected water resistance values. This unexpected, additional control feature for water-vapor flow may be usefully incorporated into the design of multilayer films, other materials such as coated fabrics and end products such as garments.

H. Properties of the Modified Sulfonated Block Copolymers

The modified sulfonated block copolymers of the present invention exhibit an unexpected profile of properties such as water-vapor permeability, elasticity, pressure adhesiveness, and metal chelating capability.

While not wishing to be bound by any particular theory, it is the present belief that the modification entails the association of an amino group of the polyoxyalkyleneamine and a sulfonic acid or sulfonate ester functional group of the sulfonated block copolymer whereby a salt structure results which involves an R—SO3− anion (R being the residue of the sulfonated block copolymer) and an R'—NH3+ cation (R being the residue of the polyoxyalkyleneamine). Further, it is present belief that the sections of the block copolymer which include the salt structures congregate to form regions with predominantly hydrophilic character whereas the non-sulfonated sections of the block copolymer congregate to form regions with predominantly hydrophobic character. The presence of the polyoxyalkyleneamines, thus, modifies the character of the ionic micro domains of the non-modified sulfonated block copolymer. On the basis of belief and observation it has been found that the particular property profile of the modified sulfonated block copolymers may be adjusted easily, and tailored to the needs of a specific application, by varying certain parameters of the non-modified sulfonated block copolymers and/or the polyoxyalkyleneamines which are used as the modifier(s).

For example, it has surprisingly been found that modifying a precursor sulfonated block copolymer with a polyoxyalkylene monoamine results in a product which is softer, more elastic, and more pressure-adhesive than a product obtained by modifying the same precursor sulfonated block copolymer with a polyoxyalkylene diamine. Conversely, a product which is obtained using a polyoxyalkylene diamine as the modifier is stiffer and less tacky than the one obtained using the polyoxyalkylene monoamine. Thus, the stiffness, elasticity and pressure-adhesiveness of the product can be tailored by varying the polyoxyalkyleneamine or the combination of two or more polyoxyalkyleneamines.

It has also surprisingly been found that the amount and the nature of the polyoxyalkyleneamine which is employed as modifier has a significant impact on the water-vapor permeability of the modified sulfonated block copolymer. For example, it has been found that increasing the amount of a polyoxyalkylene monoamine used as modifier from a ratio of 1 mol-equivalent to 3 mol-equivalent of amino groups per mol of sulfonic acid or sulfonate functional group of the sulfonated block copolymer decreases the water-vapor permeability, the adhesiveness, the elasticity and the softness of the product. Conversely, increasing the amount of a polyoxyalkylene diamine used as modifier from a ratio of 1 mol-equivalent to 3 mol-equivalent of amino groups per mol of sulfonic acid or sulfonate functional group of the sulfonated block copolymer results in an increase in the water-vapor permeability of the product. Thus, not only the stiffness, elasticity and pressure-adhesiveness but also the water-vapor permeability of the product can be tailored by the selection of the polyoxyalkyleneamine or the combination of two or more polyoxyalkyleneamines, and by varying the molar equivalents of amino groups relative to the molar amount of the sulfonic acid or sulfonate ester functional group of the non-modified sulfonated block copolymer.

Additionally, it has surprisingly been found that the tackiness of the modified sulfonated block copolymer and its water-vapor permeability are distinctly influenced by the nature of the polyoxyalkylene residue of the polyoxyalkyleneamine(s) used as modifier. In particular it has been found that the water-vapor permeability and the tackiness of the modified sulfonated block copolymer increase with increasing hydrophilic character of the polyoxyalkylene residue. Therefore, the water-vapor permeability and the tackiness of the modified sulfonated block copolymer also can be tailored to the needs of a particular application by varying the hydrophilic character of the polyoxyalkylene moiety of the polyoxyalkyleneamine or the combination of two or more polyoxyalkyleneamines.

Accordingly, in some embodiments the precursor sulfonated block copolymer is "plasticized" upon being modified by the polyoxyalkyleneamines described herein. In some embodiments, the dry tensile modulus of the modified sulfonated block copolymer is equal to or less than the corresponding precursor sulfonated block copolymer. In other embodiments the dry tensile modulus is decreased to the range of from 10% to 99% of the tensile modulus of the corresponding precursor sulfonated block copolymer. In other embodiments, the dry tensile modulus is decreased to the range of from 50% to 95% of the tensile modulus of the corresponding precursor sulfonated block copolymer. In further embodiments, the dry tensile modulus is decreased to the range of from 60% to 90% of the tensile modulus of the corresponding precursor sulfonated block copolymer. In still further embodiments, the dry tensile modulus is decreased to the range of from 65% to 80% of the tensile modulus of the corresponding precursor sulfonated block copolymer. In even further embodiments, the dry tensile modulus is decreased to the range of from 70% to 75% of the tensile modulus of the corresponding precursor sulfonated block copolymer. It will be understood by those skilled in the art that suitable ranges include any combination of the specified percentages even if the specific combination and range is not listed herewith.

Furthermore, in some embodiments, the wet tensile strength at break of the modified sulfonated block copolymer is at least about 50% of the dry tensile strength at break. In other embodiments, the wet tensile strength at break of the modified sulfonated block copolymer is at least about 75% of the dry tensile strength at break. In further embodiments, the wet tensile strength at break of the modified sulfonated block copolymer is at least about 90% of the dry tensile strength at break. In further embodiments, the wet tensile strength at break of the modified sulfonated block copolymer is at about the same as the dry tensile strength at break. It will be understood by those skilled in the art that suitable ranges include any combination of the specified percentages even if the specific combination and range is not listed herewith.

It has also been found that the modified sulfonated block copolymers disclosed herein have surprisingly high water vapor transport rates. It was surprisingly found that the water vapor transport rate (WVTR) of the sulfonated block copolymers may be the same or similar to the WVTR of a corresponding precursor sulfonated block copolymer, and in some embodiments may be higher than the WVTR of the corresponding precursor sulfonated block copolymer. Accordingly, in some embodiments the WVTR is at least about 50% of the WVTR of a corresponding precursor sulfonated block copolymer. In other embodiments, the WVTR is at least about 65% of the WVTR of a corresponding precursor sulfonated block copolymer. In further embodiments, the WVTR is at least about 75% of the WVTR of a corresponding precursor sulfonated block copolymer. In still further embodiments, the WVTR is at least about 85% of the WVTR of a corresponding precursor sulfonated block copolymer. In even further embodiments, the WVTR is at least about 90% of the WVTR of a corresponding precursor sulfonated block copolymer. In additional embodiments, the WVTR is at least about 95% of the WVTR of a corresponding precursor sulfonated block copolymer. In further embodiments, the WVTR is at least about 99% of the WVTR of a corresponding precursor sulfonated block copolymer. In further particular embodiments, the WVTR is at least 100%, or at least 200%, or at least 500% of the WVTR of the corresponding precursor sulfonated block copolymer. It will be understood by those skilled in the art that suitable ranges include any combination of the specified percentages even if the specific combination and range is not listed herewith.

In some embodiments, the WVTR may also be quantified using the inverted cup method in terms of g/m2/day/mil which is the number of g of water which are transported through a membrane into a 50% relative humidity atmosphere at 25° C. using a membrane having 1 m2 of exposed area and 1 mil of thickness in a day of exposure. Accordingly, in some embodiments the modified sulfonated block copolymer has a WVTR of at least about 5,000 g/m2/day/mil. In other embodiments, the WVTR is at least about 10,000 g/m2/day/mil. In further embodiments, the WVTR is at least about 15,000 g/m2/day/mil. In even further embodiments, the WVTR is at least about 20,000 g/m2/day/mil. In still further embodiments, the WVTR is at least about 25,000 g/m2/day/mil.

It has been surprisingly found that a high WVTR can be obtained while also maintaining very good dimensional stability. Dimensional stability can refer to the overall physical shape of a membrane or article comprising the modified sulfonated block copolymer. Thus, polymers with good dimensional stability are more likely to maintain their form, and are less likely to sag or change shape in the presence of water. While there are a number of ways to measure the dimensional stability of a block copolymer, including measuring the length, width, and thickness of a membrane in both wet and dry states, one method includes measuring the water uptake of the block copolymer membrane.

Accordingly, the expression "water uptake value" as used herein refers to the weight of water which is absorbed by a block copolymer in equilibrium as compared to the original weight of the dry block copolymer, and is calculated as a percentage. A lower water uptake value indicates that less water has been absorbed and therefore corresponds to a better dimensional stability.

The surprising and advantageous dimensional stability is desirable in water management membranes, i.e., in applications where a membrane is constrained in a mounting device and small changes in the dimensions of the membrane may cause buckling and tearing, thereby inevitably causing the performance of the device to degrade or even fail. The surprising and advantageous dimensional stability is also desirable, for example, for desalination applications, humidity regulation devices, battery separators, fuel cell exchange membranes, medical tubing applications and the like.

In one embodiment, the water uptake value is equal to or less than the water uptake value of a corresponding precursor sulfonated block copolymer. In other embodiments, the water uptake value is less than 80% the water uptake value of the corresponding precursor sulfonated block copolymer. In additional embodiments, the water uptake value is less than 50% the water uptake value of the corresponding precursor sulfonated block copolymer. In further embodiments, the water uptake value is less than 25% the water uptake value of the corresponding precursor sulfonated block copolymer.

Furthermore, in some embodiments, the water uptake value of the modified sulfonated block copolymer is from 5% to 100% of the dry polymer. In other embodiments, the water uptake value of the modified sulfonated block copolymer is from 20% to 75% of the dry polymer. In additional embodiments, the water uptake value of the modified sulfonated block copolymer is from 20% to 50% of the dry polymer. In further embodiments, the water uptake value of the modified sulfonated block copolymer is from 20% to 40% of the dry polymer. In still further embodiments, the water uptake value of the modified sulfonated block copolymer is from 20% to 35% of the dry polymer. It will be understood by those skilled in the art that suitable ranges include any combination of the specified percentages even if the specific combination and range is not listed herewith.

I. Examples

The following examples are intended to be illustrative only, and are not intended to be, nor should they be construed as, limiting the scope of the present disclosure in any way.

1. Methods

Mechanical properties, including Young's modulus, tensile strength, and elongation at break, in the dry state as described herein was measured according to ASTM D412.

Mechanical properties, including Young's modulus, tensile strength, and elongation at break, in the wet state as described herein was measured similar to the method according to ASTM D412 using samples that had been equilibrated under water for a period of 24 hours prior to testing, and that were fully submerged under water for testing.

All tensile data were collected in a climate controlled room at 74° F. (23.3° C.) and 50% relative humidity.

The % swelling as reported on the materials representative of the present disclosure was measured as follows. A dry swatch of film measuring approximately 9 in2 was weighed and then placed in a jar with approximately 250 mL of distilled water. The swatch was allowed to hydrate for a period of at least 16 hrs. The swatch was then removed from the jar, both surfaces were blotted dry with an absorbent wipe for a period of several seconds, and the swatch was re-weighed. % swelling was calculated from the difference in the wet and dry weights divided by the original dry weight and multiplied by 100. Samples were run in at least duplicate.

The MTR as described herein was measured similar to ASTM E 96BW. The ASTM method was modified by using a smaller vial, employing 10 ml of water, and having an area of exposed membrane of 160 mm2 (as opposed to 3000 mm2 recommended by the ASTM method). After adding the water and sealing the vial with the membrane test specimen, the vial was inverted and placed in a controlled environment chamber where air having a temperature of 25° C. and a relative humidity of 50% was blown across the membrane. Weight loss was measured versus time, and the water transport rate was calculated on the basis of the measurements as g/m2/day. Measurements were typically taken over a period of 6-8 hours with multiple data points to insure linear transport behavior.

The degree of sulfonation as described herein and as determined by titration was measured by the following potentiometric titration procedure. The non-neutralized sulfonation reaction product solution was analyzed by two separate titrations (the "two-titration method") to determine the levels of styrenic polymer sulfonic acid, sulfuric acid, and non-polymeric by-product sulfonic acid (2-sulfoisobutyric acid). For each titration, an aliquot of about five (5) grams of the reaction product solution was dissolved in about 100 mL of tetrahydrofuran and about 2 mL of water and about 2 mL of methanol were added. In the first titration, the solution was titrated potentiometrically with 0.1N cyclohexylamine in methanol to afford two endpoints; the first endpoint corresponded to all sulfonic acid groups in the sample plus the first acidic proton of sulfuric acid, and the second endpoint corresponded to the second acidic proton of sulfuric acid. In the second titration, the solution was titrated potentiometrically with 0.14 N sodium hydroxide in about 3.5:1 methanol:water to afford three endpoints: The first endpoint corresponded to all sulfonic acid groups in the sample plus the first and second acidic proton of sulfuric acid; the second endpoint corresponded to the carboxylic acid of 2-sulfoisobutyric acid; and the third endpoint corresponded to isobutyric acid.

The selective detection the of the second acidic proton of sulfuric acid in the first titration, together with the selective detection of the carboxylic acid of 2-sulfoisobutyric acid in the second titration, allowed for the calculation of acid component concentrations.

2. Materials (a) Dispersion of a Non-Modified Sulfonated Block Copolymer A.1

A pentablock copolymer having the configuration A-D-B-D-A was prepared by sequential anionic polymerization where the A blocks are polymer blocks of para-tert-butylstyrene (ptBS), the D blocks were comprised of polymer blocks of hydrogenated isoprene (Ip), and the B blocks were comprised of polymer blocks of unsubstituted styrene (S). Anionic polymerization of the t-butylstyrene in cyclohexane was initiated using sec-butyllithium affording an A block having a molecular weight of 15,000 g/mol. Isoprene monomers were then added to afford a second block with a molecular weight of 9,000 g/mol (ptBS-Ip-Li). Subsequently, styrene monomer was added to the living (ptBS-Ip-Li) diblock copolymer solution and was polymerized to obtain a living triblock copolymer (ptBS-Ip-S-Li). The polymer styrene block was comprised only of polystyrene and had a molecular weight of 28,000 g/mol. To this solution was added another aliquot of isoprene monomer to obtain an isoprene block having a molecular weight of 11,000 g/mol. Accordingly, this afforded a living tetrablock copolymer structure (ptBS-Ip-S-Ip-Li). A second aliquot of para-tert butyl styrene monomer was added, and polymerization thereof was terminated by adding methanol to obtain a ptBS block having a molecular weight of about 14,000 g/mol. The ptBS-Ip-S-Ip-ptBS was then hydrogenated using a standard $Co^{2+}$/triethylaluminum method to remove the C=C unsaturation in the isoprene portion of the pentablock. The block polymer was then sulfonated directly (without further treatment, not oxidizing, washing, nor "finishing") using an i-butyric anhydride/sulfuric acid reagent. The hydrogenated block copolymer solution was diluted to about 10% solids by the addition of heptane (roughly an equal volume of heptane per volume of block copolymer solution). Sufficient i-butyric anhydride and sulfuric acid (1/1 (mol/mol)) were added to afford 2.0 meq of sulfonated polystyrene functionality per g of block copolymer. The sulfonation reaction was terminated by the addition of ethanol (2 mol ethanol/mol of i-butyric anhydride). The resulting polymer (A.1) was found, by potentiometric titration, to have an "Ion Exchange Capacity (IEC)" of 2.0 meq of —$SO_3H$/g of polymer. The micellar solution of sulfonated polymer had a solids level of about 10%-wt. in a mixture of heptane, cyclohexane, and ethyl i-butyrate.

A micellar solution of a similar sulfonated block copolymer (A.2) but having an IEC of 1.5 meq of —$SO_3H$/g of polymer can be prepared in a corresponding manner.

A micellar solution of a similar sulfonated block copolymer (A.3) but having an IEC of 1.0 meq of —$SO_3H$/g of polymer can be prepared in a corresponding manner.

(b) Polyoxyalkyleneamines

B.1) JEFFAMINE® M-600 (molecular weight about 600, molar ratio of 1,2-propyleneoxide to ethyleneoxide about 9:1):

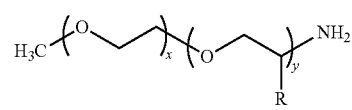

R = H for (EO), or $CH_3$ for (PO)

(B.2) JEFFAMINE® D-400 (molecular weight about 430, x about 6.1):

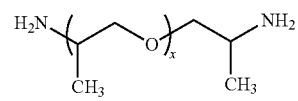

3. Casting and Coating Compositions

The compositions were prepared by adding appropriate amounts of the polyoxyalkyleneamine in substance to a dispersion (a) at a temperature of about 70° F. (about 21° C.). The amounts of the polyoxyalkyleneamines and the dispersion (a) were determined based on the desired mol-equivalent of the amino groups of the polyoxyalkyleneamine per sulfonic acid or sulfonate ester functional group of the precursor sulfonated block copolymer.

Illustrative compositions are compiled in the following table:

| Composition Example No. | Non-Modified Sulfonated Block Copolymer | Polyoxy-alkylene-amine | Sulfonic Functional Group: Amino Group [mol-equivalent] |
|---|---|---|---|
| I.1 | A.1 | B.1 | 0.5 |
| I.2 | A.1 | B.1 | 1.0 |
| I.3 | A.1 | B.1 | 2.0 |
| I.4 | A.1 | B.1 | 3.0 |
| I.5 | A.2 | B.1 | 0.5 |
| I.6 | A.2 | B.1 | 1.0 |
| I.7 | A.2 | B.1 | 2.0 |
| I.8 | A.2 | B.1 | 3.0 |
| I.9 | A.3 | B.1 | 0.5 |
| I.10 | A.3 | B.1 | 1.0 |
| I.11 | A.3 | B.1 | 2.0 |
| I.12 | A.3 | B.1 | 3.0 |
| I.13 | A.1 | B.2 | 0.5 |
| I.14 | A.1 | B.2 | 1.0 |
| I.15 | A.1 | B.2 | 2.0 |
| I.16 | A.1 | B.2 | 3.0 |
| I.17 | A.2 | B.2 | 0.5 |
| I.18 | A.2 | B.2 | 1.0 |
| I.19 | A.2 | B.2 | 2.0 |
| I.20 | A.2 | B.2 | 3.0 |
| I.21 | A.3 | B.2 | 0.5 |
| I.22 | A.3 | B.2 | 1.0 |
| I.23 | A.3 | B.2 | 2.0 |
| I.24 | A.3 | B.2 | 3.0 |

The investigations into the properties of the films of Examples Nos. I.2, I.3 and I.4 show that the softest and most elastic films were obtained when reacting the constituents at a stoichiometry of 1 SO3H:1 NH2 (Example No. I.2). The film of Example No. I.2 exhibited a very aggressive adhesion to metal and glass (including to the siliconized glass designed to be a release surface). Surprisingly, the complete neutralization of the sulfonic acid groups also lead to the highest measured WVTR which were comparable to those of a film produced from non-modified sulfonated block copolymer (A.1) which had an average WVTR of 32,560 g/m2/day. This stoichiometry resulted in the highest viscosity solution (a gel), and could be drawn down to make a high quality film. The water-vapor transmission rates of the films of Examples Nos. I.2, I.3 and I.4 are depicted in FIG. 1.

Figure 2:
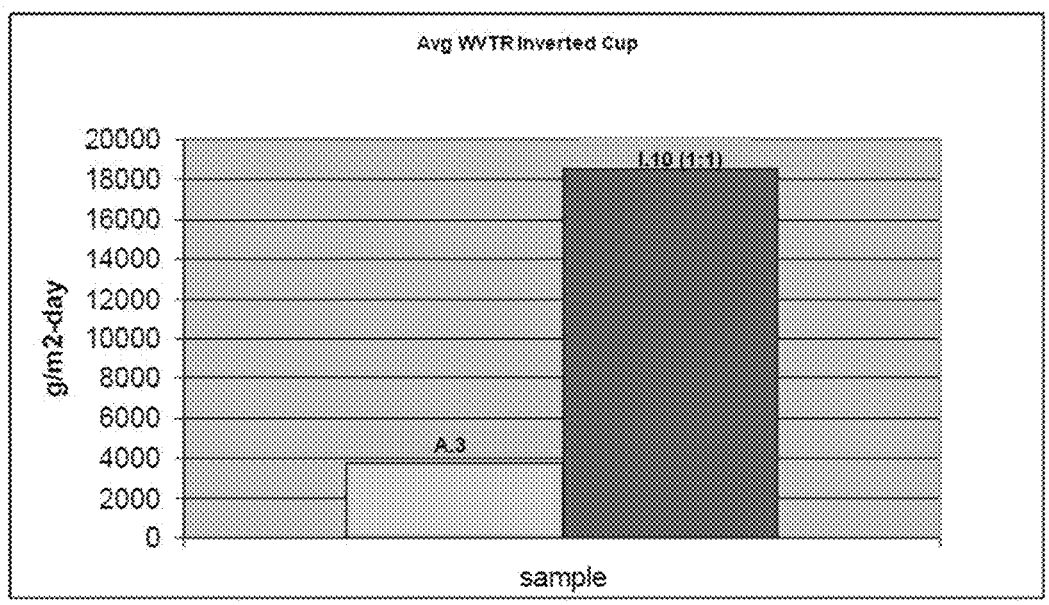
FIG. 2 illustrates the effects of modifying a sulfonated block copolymer with a polyoxyalkylene monoamine on the water-vapor permeability.

The investigations into the properties of the film of Example No. I.10 showed that the modification of the sulfonated block copolymer at a stoichiometry of 1 SO3H:1 NH2 significantly increased the water-vapor transmission rate. The water-vapor transmission rates of the film of Example No. I.10 FIG. 2.

Figure 3:
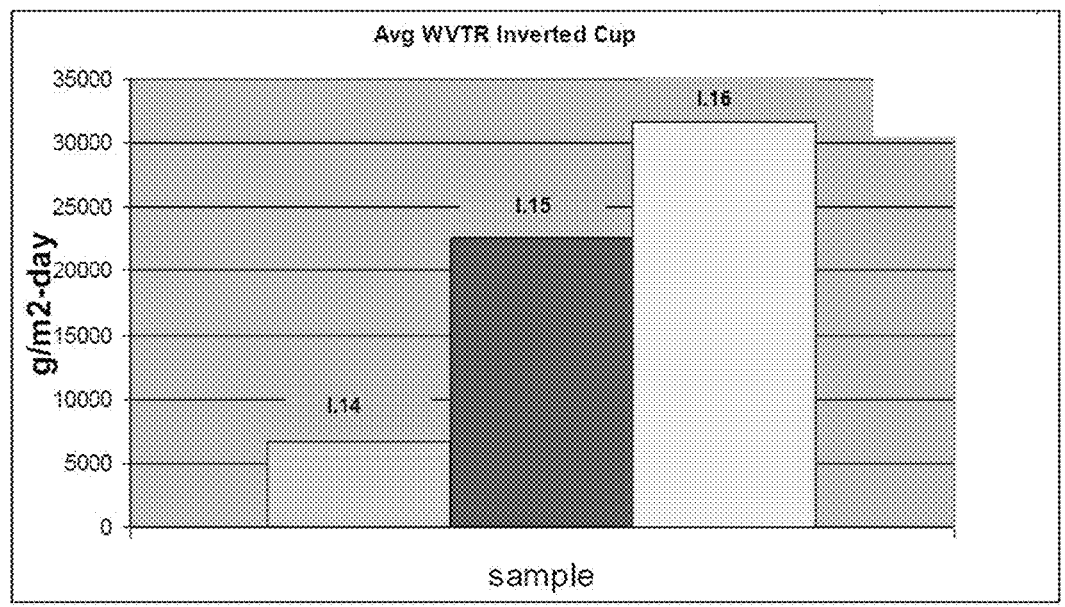
FIG. 3 illustrates the effects of modifying a sulfonated block copolymer with increasing amounts of a polyoxyalkylene diamine on the water-vapor permeability.

The investigations into the properties of the films of Examples Nos. I.14, I.15 and I.16 show that the water-vapor permeability increased with an increase in the amount of modifier. The water-vapor transmission rates of the films of Examples Nos. I.14, I.15 and I.16 are depicted in FIG. 3.

The invention claimed is:

1. A polyoxyalkyleneamine modified sulfonated block copolymer comprising:
   a. at least one sulfonated block copolymer comprising at least two polymer end blocks A and at least one polymer interior block B, wherein
   each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block; and
   b. at least one polyoxyalkyleneamine in an amount of from about 0.6 to 2 mol-equivalent of amine groups per mol sulfonic acid or sulfonate ester functional groups of the sulfonated block copolymer.

2. The modified sulfonated block copolymer of claim 1, wherein each B block comprises segments of one or more vinyl aromatic monomers selected from polymerized (i) unsubstituted styrene monomers, (ii) ortho-substituted styrene monomers, (iii) metasubstituted styrene monomers, (iv) alpha-methylstyrene, (v) 1,1-diphenylethylene, (vi) 1,2-diphenylethylene and (vii) mixtures thereof.

3. The modified sulfonated block copolymer of claim 1, having a general configuration A-B-A, A-B-A-B-A, (A-B-A)$_n$X, (A-B)$_n$X, A-D-B-D-A, D-B-A, (A-DB)$_n$X, (A-B-D)$_n$X, or mixtures thereof, where n is an integer from 2 to about 30, and X is a coupling agent residue and wherein each D block is a polymer block resistant to sulfonation and the plurality of A blocks, B blocks, or D blocks are the same or different.

4. The modified sulfonated block copolymer of claim 1, comprising one or more blocks D each block D being independently selected from the group consisting of (i) a polymerized or copolymerized conjugated diene selected from isoprene 1,3-butadiene having a vinyl content prior to hydrogenation of between 20 and 80 mol percent, (ii) a polymerized acrylate monomer, (iii) a silicone polymer, (iv) polymerized isobutylene and (v) mixtures thereof, wherein any segments containing polymerized 1,3-butadiene or isoprene are subsequently hydrogenated.

5. The modified sulfonated block copolymer of claim 1, wherein the amount of polyoxyalkyleneamine(s) is from about 0.8 to 1.6 mol equivalent.

6. The modified sulfonated block copolymer of claim 1, wherein the polyoxyalkyleneamine has a molecular weight of from about 140 to about 10,000.

7. The modified sulfonated block copolymer of claim 1, wherein the polyoxyalkyleneamine comprises at least one polyoxyalkylenediamine or at least one polyoxyalkylenetriamine.

8. The modified sulfonated block copolymer of claim 1, comprising at least one polyoxyalkyleneamine of formula

wherein $R^1$ is $C_1$-$C_{18}$-alkyl, phenyl, optionally substituted with one or more identical or different groups selected from halogen, $C_1$-$C_{12}$-alkyl, $C_1$-$C_{12}$-haloalkyl, $C_1$-$C_{12}$-alkoxy or $C_1$-$C_{12}$-haloalkoxy, or amino-$C_2$-$C_4$-alkylene, A is in each case independently $C_2$-$C_4$-alkylene, and x is a number from about 2 to about 100.

9. A membrane or film comprising the modified sulfonated block copolymer of claim 1.

10. An apparatus comprising a membrane which apparatus is selected from the group consisting of:
   filtration devices, devices for controlling humidity, devices for forward electrodialysis, devices for reverse electrodialysis, devices for pressure retarded osmosis, devices for forward osmosis, devices for reverse osmosis, devices for selectively adding water, devices for selectively removing water, and batteries,
   wherein the membrane comprises the modified sulfonated block copolymer defined in claim 1.

11. A coated article comprising a substrate and a coating composition comprising:
   a. at least one sulfonated block copolymer comprising at least two polymer end blocks A and at least one polymer interior block B, wherein
      each A block contains essentially no sulfonic acid or sulfonate ester functional groups and each B block is a polymer block containing from about 10 to about 100 mol % sulfonic acid or sulfonate ester functional groups based on the number of sulfonation susceptible monomer units of the B block; and
   b. at least one polyoxyalkyleneamine in an amount of from about 0.6 to 2 mol-equivalent of amine groups per mol sulfonic acid or sulfonate ester functional groups of the sulfonated block copolymer.

12. The coated article of claim 11, wherein the substrate is a natural or synthetic, woven or non-woven material, or a mixture thereof.

13. The coated article of claim 11, wherein the substrate is flexible or elastic.

14. The coated article of claim 11, wherein the coating is pressure-adhesive.

15. The modified sulfonated block copolymer of claim 1, wherein polyoxyalkyleneamine comprises ethylene moieties and 1,2-propylene moieties, wherein a molar amount of the ethylene moieties is equal to or greater than the molar amount of 1,2-propylene moieties.

16. The modified sulfonated block copolymer of claim 1, wherein polyoxyalkyleneamine comprises 0.1 to 0.2 mol of ethylene moieties per mol of 1,2-propylene moieties.

17. The modified sulfonated block copolymer of claim 1, wherein the modified sulfonated block copolymer has a water vapor transport rate of at least 32,560 g/m2/day/mil.

* * * * *